US007535625B2

(12) United States Patent
Kataoka

(10) Patent No.: US 7,535,625 B2
(45) Date of Patent: May 19, 2009

(54) IMAGE RECORDING APPARATUS

(75) Inventor: Yoshikazu Kataoka, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 315 days.

(21) Appl. No.: 11/407,063

(22) Filed: Apr. 20, 2006

(65) Prior Publication Data

US 2006/0238606 A1 Oct. 26, 2006

(30) Foreign Application Priority Data

Apr. 20, 2005 (JP) ........................... P2005-122577
Jan. 11, 2006 (JP) ........................... P2006-003197

(51) Int. Cl.
*G02B 26/08* (2006.01)
*G02B 15/14* (2006.01)
*B41J 27/00* (2006.01)

(52) U.S. Cl. ........................ 359/298; 347/256; 359/694

(58) Field of Classification Search ................. 359/298; 347/256
See application file for complete search history.

(56) References Cited

U.S. PATENT DOCUMENTS

| | | | | |
|---|---|---|---|---|
| 5,923,358 | A | 7/1999 | Yamakawa | |
| 6,806,897 | B2 | 10/2004 | Kataoka et al. | |
| 2002/0051055 | A1 | 5/2002 | Morizono et al. | |
| 2005/0018038 | A1* | 1/2005 | Ramanujan et al. | 347/241 |

FOREIGN PATENT DOCUMENTS

| | | | |
|---|---|---|---|
| EP | 1 258 743 | A2 | 11/2002 |
| EP | 1 310 375 | A1 | 5/2003 |
| JP | 2000-131628 | | 5/2000 |
| JP | 2003-140354 | | 5/2003 |
| JP | 2004-42273 | | 2/2004 |

* cited by examiner

*Primary Examiner*—Jordan M. Schwartz
*Assistant Examiner*—James C Jones
(74) *Attorney, Agent, or Firm*—McDermott Will & Emery LLP

(57) ABSTRACT

A projection optical system has first to fourth lens groups (51) to (54) provided in this order from a SLM, a mirror (32) having an opening is provided between the first lens group (51) and the second lens group (52), and an aperture plate (132) is provided between the third lens group (53) and the fourth lens group (54). Zeroth order light which is signal light from the SLM passes through each opening of the mirror (32) and the aperture plate (132) to be guided to a recording medium, and a part of first order diffracted light is reflected by the mirror (32) to be guided outside and received by an external light-block water-cooling jacket. The rest of the first order diffracted light is blocked by the aperture plate (132), and heat generated by light blocking is removed by a cooling mechanism connected to the aperture plate (132).

18 Claims, 16 Drawing Sheets

IMAGE RECORDING APPARATUS

BACKGROUND OF THE INVENTION

1. Field of the Invention

The present invention relates to an image recording apparatus for recording an image on a recording medium by applying light from a spatial light modulator of diffraction grating type.

2. Description of the Background Art

In recent years, a spatial light modulator (hereinafter, referred to as "SLM (Spatial Light Modulator)") of reflection type has been used for forming an image on a screen of a display system for so-called e-cinema where a movie is reproduced from digitized movie information. Such a reflection type SLM has been used to record an image with light in printing and plate-making equipment.

A reflection type SLM controls ON/OFF of each device element corresponding to pixels of an image to be projected, and light is modulated spatially. As a typical reflection type SLM where device elements are arranged two-dimensionally, a digital micromirror device (DMD) has been known. A grating light valve (GLV (registered trademark)) has been known as a typical reflection type SLM where device elements are arranged one-dimensionally.

For the DMD, tiny mirrors are arranged two-dimensionally and light is modulated spatially by inclining each mirror separately. On the other hand, the GLV is a reflection type SLM of diffraction grating type, where several thousands of fine ribbons for reflection are arranged, and light is diffracted by changing height of a reflection surface of every other ribbon with electric force. In a case where electric force does not exert on the ribbons, zeroth order light (zeroth order diffracted light) of incident light is obtained as normally reflected light. In a case where electric force exerts on the ribbons, +/− first order diffracted lights (hereinafter, referred to as "first order diffracted light") are guided. Normally, the zeroth order light is signal light for recording an image, and the first order diffracted light is eliminated as non-signal light.

In the meantime, a method called computer to plate (hereinafter, referred to as "CTP") has been generally known in the recent printing and plate making industry, where direct-imaging is performed on a photosensitive material which is a thermal recording medium. In the CTP, it is desired that, from the viewpoint of sensitivity of a photosensitive material, light as strong as possible should be guided to the photosensitive material. When the GLV is used in the CTP, first order diffracted light having almost the same amount of light as zeroth order light is generated, and thus it is important to remove the first order diffracted light sufficiently.

This matter is especially important in an optical system where the GLV and a high-power laser are used, and for example, Japanese Patent Application Laid Open Gazette No. 2003-140354 discloses a technique for removing heat caused by heat blocking by guiding unnecessary non-signal light or light from a light source in non-exposure to a jacket for cooling.

When first order diffracted light is vignetted inside a projection optical system for projecting light from the GLV onto a photosensitive material, unnecessary light is complicatedly irradiated to an inner surface of a lens barrel or a plurality of optical parts. As a result, for example, fluctuation of signal light occurs due to rise of temperature of lenses or metal fittings, and this causes problems, such as degradation or instability in output quality, damage on lenses, or the like.

SUMMARY OF THE INVENTION

The present invention is intended for an image recording apparatus for recording an image on a recording medium by using a spatial light modulator of diffraction grating type such as GLV. It is an object of the present invention to improve quality of image recording, and more particularly to remove heat from inside a lens barrel easily.

The image recording apparatus in accordance with the present invention comprise a light source, a spatial light modulator having a plurality of light modulator elements of diffraction grating type for reflecting light from the light source, a projection optical system for guiding zeroth order light from the plurality of light modulator elements to a recording medium and projecting an image of the spatial light modulator onto the recording medium, and a scanning mechanism for scanning the recording medium with an irradiation of the zeroth order light. The projection optical system comprises a lens barrel, a plurality of lenses arranged in the lens barrel, a light blocking part for blocking first order diffracted light from the plurality of light modulator elements in the lens barrel, and a heat removing part for removing heat generated by light blocking performed by the light blocking part.

In the image recording apparatus, it is possible to improve quality of image recording by removing heat generated by blocking first order diffracted light in the lens barrel.

According to a preferred embodiment of the present invention, the light blocking part is an aperture plate located at a position among the plurality of lenses. The heat removing part is a cooling mechanism connected to the aperture plate. With this structure, it is possible to easily remove heat generated by blocking first order diffracted light in the lens barrel. Since a lens group between the aperture plate and the spatial light modulator has negative power, light can be guided to lenses between the aperture plate and the recording medium easily.

According to another preferred embodiment of the present invention, the light blocking part comprises an aperture plate located among the recording medium and the plurality of lenses and located in the lens barrel, and a mirror for reflecting a part of first order diffracted light from the spatial light modulator, and the mirror is located between the spatial light modulator and the aperture plate among the plurality of lenses. Also in the preferred embodiment, it is possible to easily remove heat generated by blocking first order diffracted light in the lens barrel.

According to the preferred embodiment, if at least one lens is located between the aperture plate and the mirror, it becomes possible to easily design for preventing luminous flux limited by the mirror from being vignetted by the lens.

Preferably, at least one lens between the spatial light modulator and the mirror has positive power and enough size to receive all first order diffracted light from the spatial light modulator, and a part of the first order diffracted light from the spatial light modulator is guided to the mirror through the at least one lens, and the part of the first order diffracted light reflected by the mirror is guided outside the lens barrel through the at least one lens. This makes it possible to stably prevent first order diffracted light from being applied into the lens barrel with a simple structure.

When the at least one lens between the spatial light modulator and the mirror includes a doublet structure, it is possible to suppress spherical aberration in the projection optical system.

In any preferred embodiments, preferably, (AP1/AP2) is smaller than 1.7, where AP1 is the maximum aperture of lenses which are included in a lens group closest to the spatial light modulator among the plurality of lenses, and AP2 is the maximum aperture of lenses between the lens group and the aperture plate. This makes it possible to easily design for preventing first order diffracted light passed through the lens group closest to the spatial light modulator from being vignetted by lenses between the lens group and the aperture plate.

Also, preferably, (L1/L2) is smaller than 5.0, where L1 is a distance between the spatial light modulator and the recording medium, and L2 is a distance between the spatial light modulator and a lens closest to the spatial light modulator among the plurality of lenses. This makes it possible to easily avoid interference between light applied to the spatial light modulator and the projection optical system.

Since the light source comprises a semiconductor laser, it is possible to record an image on a recording medium with strong light, and more preferably a projection ratio of the projection optical system is variable.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
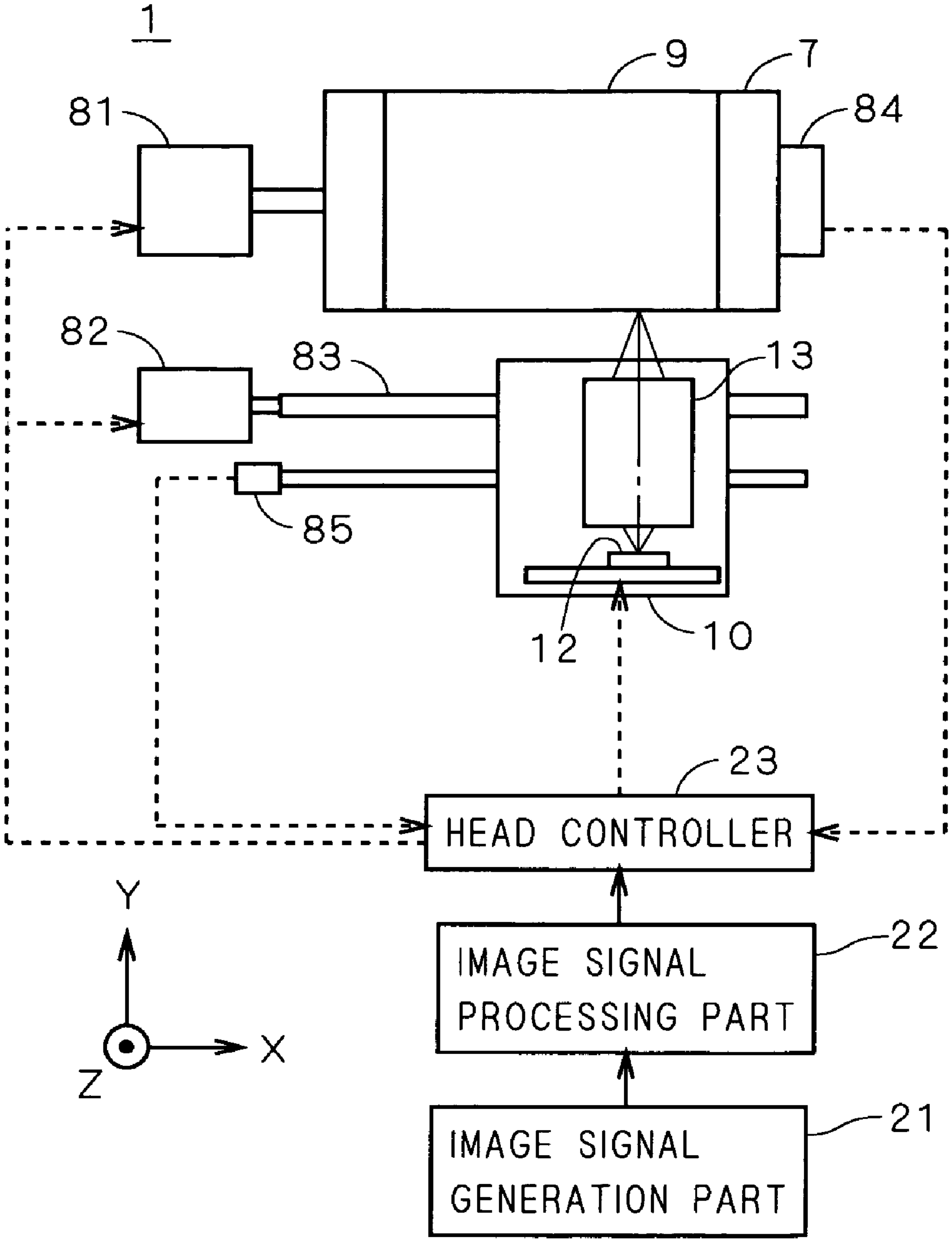
FIG. 1 is a view showing a construction of an image recording apparatus.

FIG. 1 is a view showing a constitution of an image recording apparatus 1 in accordance with a preferred embodiment of the present invention. The image recording apparatus 1 is an apparatus for recording an image on a recording medium 9 by irradiation of light and has an optical head 10 which emits light for recording an image and a holding drum 7 for holding the recording medium 9 on which an image is recorded by exposure. As the recording medium 9, for example, used are a printing plate, a film for forming the printing plate and the like. A photosensitive drum for plateless printing may be used as the holding drum 7 and in this case, it is understood that the recording medium 9 corresponds to a surface of the photosensitive drum and the holding drum 7 holds the recording medium 9 as a unit.

The holding drum 7 rotates about a central axis of its cylindrical surface holding the recording medium 9 by a motor 81 and the optical head 10 is moved by a motor 82 and a ball screw 83 in parallel to a rotation axis of the holding drum 7 (in the X direction of FIG. 1). The rotation angle of the holding drum 7 and the position of the optical head 10 are detected by encoders 84, 85. The rotation speed of the holding drum 7 depends on its diameter. For example, in a case where a diameter of the holding drum 7 is about 360 mm, which allows kiku-zen size (1030×800 mm) to be wound, the rotation speed is normally 100 to 1000 rmp. The rotation accuracy is maintained by the encoder 84.

Signal light (zeroth order light discussed later) is emitted from the optical head 10 while the position of the optical head 10 is controlled, and the signal light is applied to the recording medium 9 on the holding drum 7 being rotated, to record (i.e., write) an image on the recording medium 9. At this time, a writing position on the recording medium 9 and a position with respect to an adjacent writing region (swath) at every rotation of the holding drum 7 are controlled on the basis of signals from the encoders 84, 85 with high accuracy. Every time when the holding drum 7 is rotated and main scanning is performed, the optical head 10 moves by one swath and sub scanning is performed. Writing is performed on all the area of the recording medium 9 while sub scanning continuously. The motor 81 for rotating the holding drum 7 or the motor 82 for sub scanning on the optical head 10 functions as a mechanism for scanning an irradiation position of signal light from the optical head 10 on the recording medium 9.

The optical head 10 has a SLM (spatial light modulator) 12 having a plurality of light modulator elements aligned in the X direction (sub scan direction) and a projection optical system 13 which guides signal light from the SLM 12 to the recording medium 9.

An image signal generation part 21 generates a signal representing an image from image data stored in advance, to input an image signal to an image signal processing part 22. The image signal processing part 22 converts the image signal into a SLM control signal in accordance with the specification of the SLM 12 of the optical head 10 and a movement control signal of the optical head 10, and various driving circuits in a head controller 23 control operations of the motors 81, 82 and the SLM 12 while receiving signals from the encoders 84, 85, whereby an image is recorded on the recording medium 9.

Figure 2:
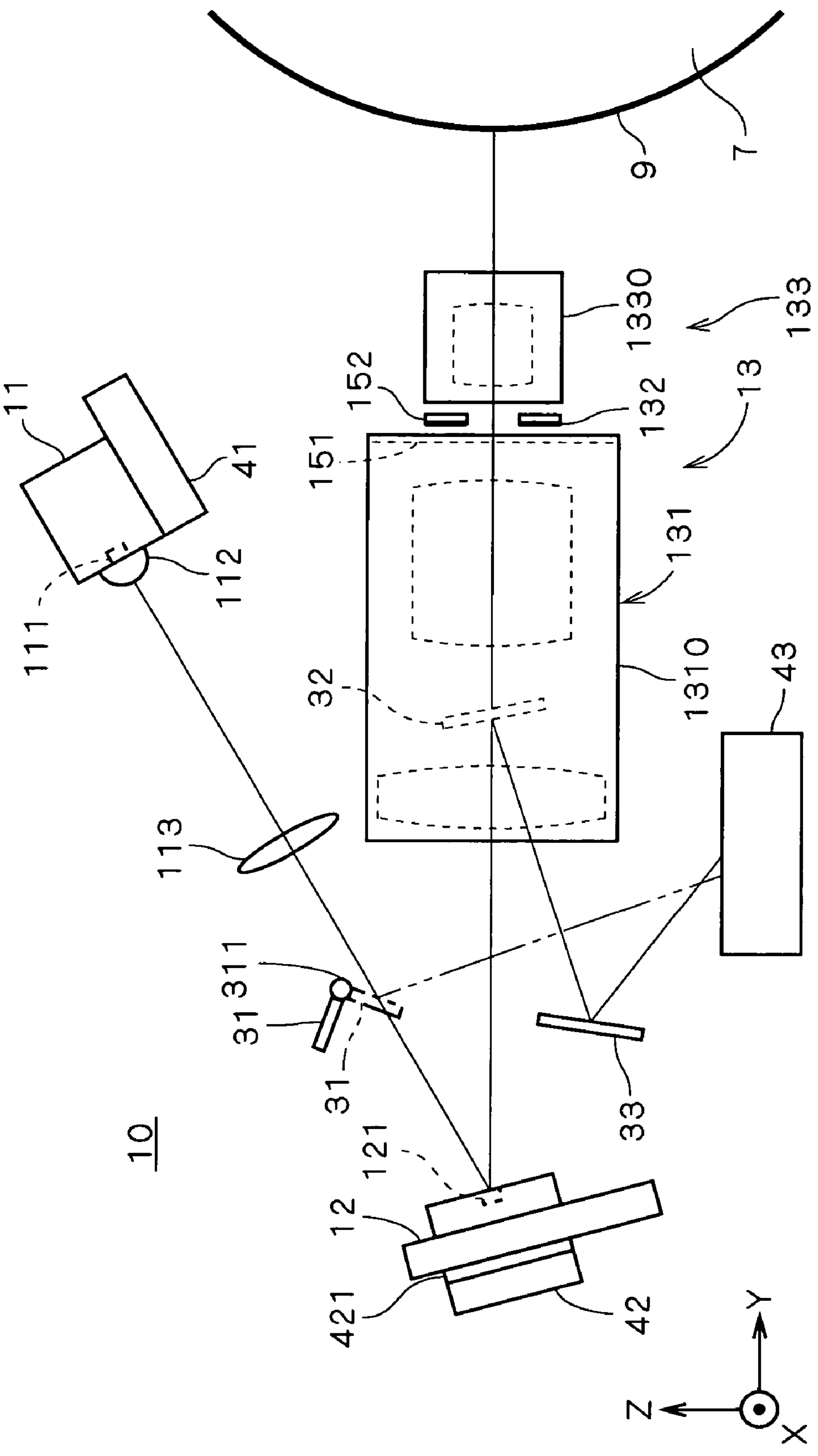
FIG. 2 is a view showing constituent elements inside an optical head.

FIG. 2 is a view showing constituent elements inside the optical head 10. The optical head 10 has a semiconductor laser (hereinafter, referred to as "bar LD") 11 having laser emitters 111 as a light source, a reflection type and diffraction grating type SLM 12, to which light from the bar LD 11 is guided through a lens 113. Signal light from the SLM 12 is guided to the holding drum 7 through the projection optical system 13. The optical head 10 further has a mirror 31 to switch between irradiation and blocking of light on the SLM 12, a light-source water-cooling jacket 41, a device water-cooling jacket 42 and a light-block water-cooling jacket 43 which perform cooling with water as a refrigerant. The SLM 12 contacts with a heat spreader 421 and the device water-cooling jacket 42 cools the SLM 12 through the heat spreader 421.

The bar LD 11 is a bar-type laser, which has a plurality of light emitting points (i.e., emitters 111) which are aligned in the X direction perpendicular to a sheet of FIG. 2. Lights from the laser emitters 111 are collimated in a direction parallel to the sheet by a lens 112 provided in the bar LD 11. The lights from a plurality of light emitting points are condensed on the SLM 12 while being superimposed by the lens 113. At this time, the projection optical system 13 is located at a position without blocking the light. When using a thermal sensitive material, a wavelength of light from the bar LD 11 is set at 780 to 850 nm, and output is set at several tens watts to several hundreds, for example. By using a semiconductor laser as a light source, it is possible to achieve size reduction and to record an image on a recording medium with strong light.

The SLM 12 has a plurality of light modulator elements 121 of diffraction grating type aligned in the direction perpendicular to the sheet, and the SLM 12 reflects light from the bar LD 11, to perform spatial light modulations. On a substrate of the SLM 12, a circuit to drive the light modulator elements 121 is also provided. The above-discussed heat spreader 421 transfers both of light energy absorbed by the SLM 12 and heat generated in the driving circuit.

Figure 3:
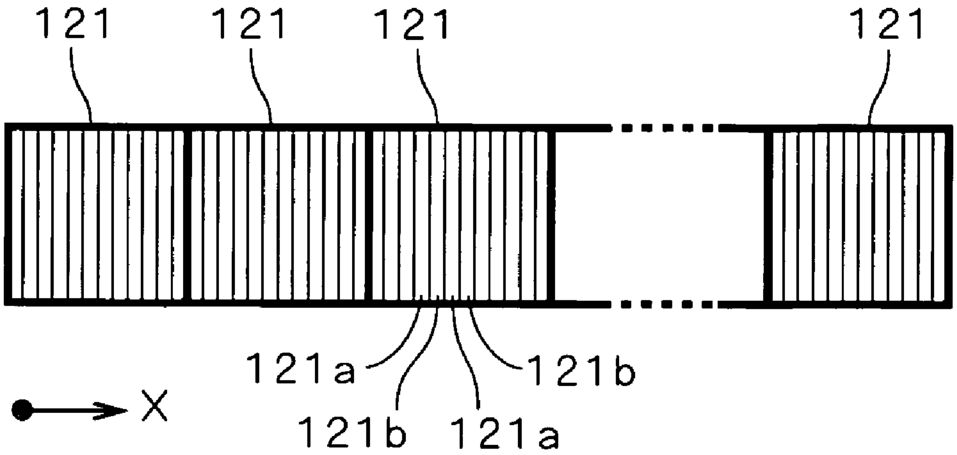
FIG. 3 is an enlarged view of aligned light modulator elements.

FIG. 3 is an enlarged view of the aligned light modulator elements 121. The light modulator elements 121 are manufactured by using a semiconductor manufacturing technique, and each of the light modulator elements 121 is a diffraction grating which can change the depth of grooves. In the light modulator element 121, a plurality of ribbon-like members **121*a* and 121*b* are formed in parallel to one another along a reference plane parallel to the sheet, and the members 121*a* are vertically movable with respect to the reference plane and the members 121*b*** are fixed with respect to the reference plane.

Therefore, by vertically moving the members **121*a* as bottom surfaces of the grooves of the diffraction grating, the light modulator element 121 can selectively emit a zeroth order light beam (i.e., a zeroth order diffracted light beam which is a non-diffracted light beam) and first order diffracted light beams, which are diffracted in different directions. The zeroth order light beam is used as a signal light for image recording and guided to the holding drum 7 through the projection optical system 13, and other diffracted light beams such as mainly the first order diffracted light beams are used as non-signal lights. By controlling the amount of movement of the members 121*a*** in an analog (sequent) manner, it is possible to control the quantity of a signal light. Among such light modulators are grating light valve (GLV (registered trademark)) of Silicon Light Machines (Sunnyvale, USA) and the like.

The projection optical system 13 shown in FIG. 2 is a both-side telecentric system. FIG. 1 shows the projection optical system 13 by one rectangle, but actually, the projection optical system 13 comprises a first optical system 131 on the SLM 12 side and a second optical system 133 on the holding drum 7 side with an aperture plate 132 interposed therebetween. The SLM 12 and the recording medium 9 are optically conjugated, the projection optical system 13 guides a zeroth order light beam from each of the plurality of light modulator elements 121 of the SLM 12 to the recording medium 9, and an image of the SLM 12 is projected onto the recording medium 9. Therefore, the light from the light modulator elements 121 which emit the signal lights (i.e., zeroth order light beams) is guided as fine light spots to corresponding positions on the recording medium 9 and the recording medium 9 is exposed to the light.

In a lens barrel 1310 of the first optical system 131, a mirror 32 having an opening in the vicinity of an optical axis is provided together with a plurality of lenses and the mirror 32 is inclined with respect to the optical axis. A part of non-signal light (i.e., non-signal light beams) from the SLM 12 is reflected by the mirror 32, further reflected by a mirror 33 and guided to the light-block water-cooling jacket 43. In other words, the mirrors 32, 33 and a light receiving surface of the light-block water-cooling jacket 43 block the part of non-signal light which is undesired light from the SLM 12. Between the first optical system 131 and the aperture plate 132, provided is a protective glass 151 for protecting lenses which move in varying a projection ratio which is later discussed. The protective glass 151 has parallel planes and prevents dust from attaching to lenses. In a lens barrel 1330 of the second optical system 133, a plurality of lenses are fixed.

Though in the preferred embodiment, in the projection optical system 13, a lens barrel inside which a plurality of lenses are arranged is divided into two elements of lens barrels 1310, 1330, the lens barrels 1310, 1330 may be provided as one lens barrel or three or more elements of a lens barrel can be provided as one lens barrel inside which a plurality of lenses in the projection optical system 13 are arranged.

One metal plate is laminated to a metal plate which is the aperture plate 132 with locating spacers therebetween to form a channel for cooling water between the two metal plates. In other words, a cooling mechanism 152 having the channel is directly connected to the aperture plate 132, light which has not blocked by the mirror 32 is blocked by the aperture plate 132 and heat generated by light blocking is removed actively.

The mirror 31 is moved by a drive shaft 311 between a position off an optical path from the bar LD 11 to the SLM 12 and a position on the optical path. In a case where a high-power laser is used as a light source, it needs to be continuously lighting for a stable output, and the mirror 31 is thus taken off the optical path during exposure and reflects the light from the bar LD 11 to guide it to the light-block water-cooling jacket 43 during non-exposure (such as on standby). Since the mirror 31 and the light receiving surface of the light-block water-cooling jacket 43 receive the light in non-exposure, the light from the bar LD 11 is not applied to the SLM 12. This prevents the light from continuously applied to the SLM 12 during non-exposure and the light from leaking out from the optical head 10 to the recording medium 9.

The angle of the mirror 31 and the positions of the mirrors 32, 33 in light blocking are so determined as to guide the light from the mirrors 31, 33 to almost the same region of the light receiving surface of the light-block water-cooling jacket 43. This allows reduction in size of the light-block water-cooling jacket 43. The light receiving surface on the light-block water-cooling jacket 43 is made of such a material as to efficiently absorb the light from the bar LD 11.

As discussed above, in the optical head 10 of the image recording apparatus 1, since all of the constituent elements which cause heat generation, i.e., the bar LD 11, the SLM 12 and the light receiving surface of the light-block water-cooling jacket 43 irradiated with the undesired light, are cooled, it is possible to adequately suppress heat emission from the constituents relevant to exposure and suppress the temperature rise in the optical head 10. As a result, the displacement of the precise optical system, the deformation of parts, the fluctuation of signal lights can be prevented. By actively removing the heat generated by blocking of the undesired light, in particular, ill-effect of the heat on the optical system can be adequately prevented.

Further, by collecting a part of the undesired light such as the light in non-exposure or the non-signal light onto the light-block water-cooling jacket 43 with the mirrors 31 to 33, it is possible to adequately block the undesired light generated at a plurality of portions with one water-cooling jacket, and by removing the heat generated by light blocking at a position away from the optical system, it is possible to easily prevent the ill-effect of heat generation in the optical system.

Figure 4:
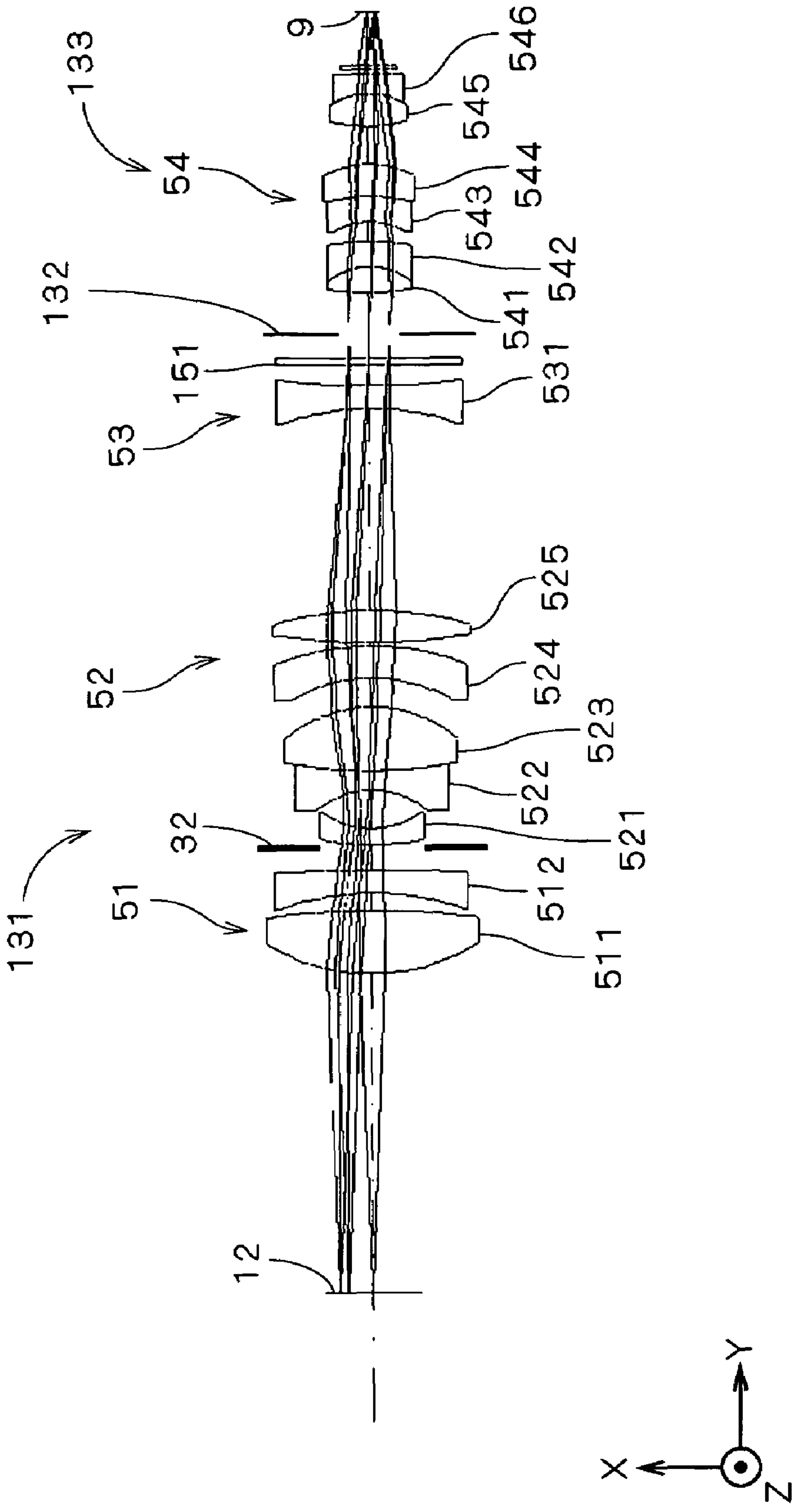
FIG. 4 is a plan view showing optical elements of a projection optical system.

FIG. 4 is a plan view showing optical elements of the projection optical system 13. As discussed above, the projection optical system 13 comprises the first optical system 131, the aperture plate 132, and the second optical system 133 provided in this order from the SLM 12. In the lens barrel 1310 (see FIG. 2) of the first optical system 131, a first lens group 51, the mirror 32, a second lens group 52, a third lens group 53, and the protective glass 151 are provided from the SLM 12 toward the recording medium 9 of the holding drum 7. In the lens barrel 1330 of the second optical system 133, a fourth lens group 54 is provided. It is noted that the lens barrels 1310, 1330 and the cooling mechanism 152 for the aperture plate 132 are omitted in FIG. 4.

The first lens group 51 comprises a biconvex lens 511 and a negative meniscus lens 512 which is convex toward the recording medium 9 (image side) provided from the SLM 12 (object side). The second lens group 52 comprises a negative meniscus lens 521 which is convex toward the object side, a biconcave lens 522, a biconvex lens 523, a negative meniscus lens 524 which is convex toward the image side, and a biconvex lens 525 provided in this order from the SLM 12, and the lens 522 and the lens 523 are laminated. The third lens group 53 only comprises a biconcave lens 531. The fourth lens group 54 comprises a biconvex lens 541, a negative meniscus lens 542 which is convex toward the image side, a negative meniscus lens 543 and a positive meniscus lens 544 which are convex toward the image side, a biconvex lens 545, and a biconcave lens 546 from the object side. The lens 541 and the lens 542, the lens 543 and the lens 544, and the lens 545 and the lens 546 are laminated respectively.

Figure 5:
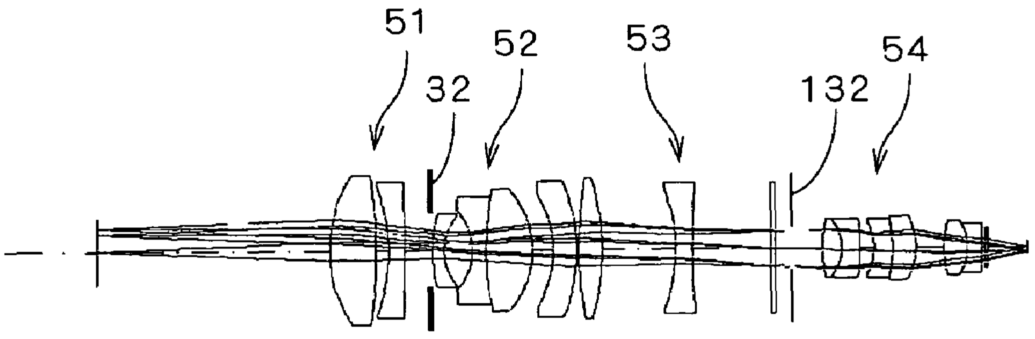
FIG. 5 is a plan view showing the projection optical system after a projection ratio is varied.
Figure 6:
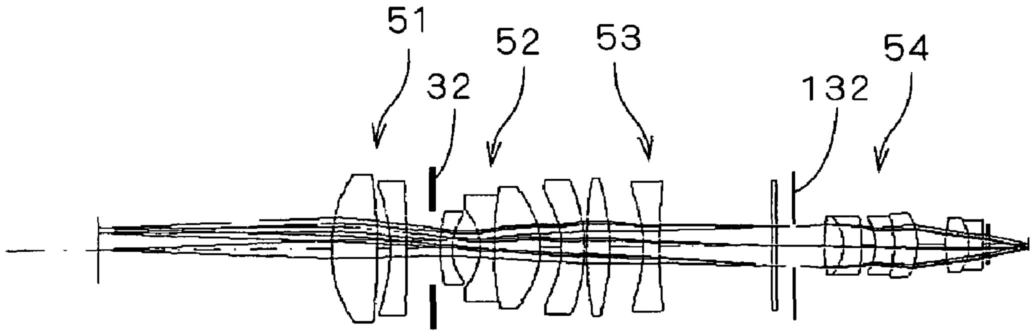
FIG. 6 is a plan view showing the projection optical system after a projection ratio is varied.

The projection optical system 13 has a variable projection ratio, and FIG. 4 shows an arrangement of lenses at a telephoto end. FIGS. 5 and 6 respectively show the projection optical system 13 at a middle position and a wide-angle end. As shown in FIGS. 4 to 6, when the projection ratio is varied in the projection optical system 13, the second lens group 52 and the third lens group 53 move along the optical axis. Surface numbers, radiuses of curvature, distances between surfaces, refractive indexes, and Abbe numbers which are from the object side are as shown in Table 1, and a distance $d_4$ between surface numbers 4 and 5, a distance $d_{13}$ between surface numbers 13 and 14, a distance $d_{15}$ between surface numbers 15 and 16, and change by varying a projection ratio are as shown in Table 2, where a wavelength of light is 808 nm and a numerical aperture NA on the object side is 0.04.

TABLE 1

| SURFACE NUMBER | RADIUS OF CURVATURE | DISTANCE BETWEEN SURFACES | REFRACTIVE INDEX | ABBE NUMBER | NOTE |
|---|---|---|---|---|---|
| 0 | ∞ | 100.000000 | | | OBJECT SURFACE |
| 1 | 60.38520 | 20.000000 | 1.88300 | 40.8 | |
| 2 | −234.32220 | 5.500000 | | | |
| 3 | −79.71380 | 7.000000 | 1.48750 | 70.2 | |
| 4 | −625.95430 | $d_4$ | | | |
| 5 | 69.01640 | 5.000000 | 1.76182 | 26.5 | |
| 6 | 24.06980 | 12.000000 | | | |
| 7 | −26.25010 | 6.000000 | 1.76182 | 26.5 | |
| 8 | 135.30000 | 20.000000 | 1.88300 | 40.8 | |
| 9 | −40.33110 | 9.000000 | | | |
| 10 | −47.33800 | 10.000000 | 1.76182 | 26.5 | |
| 11 | −77.23180 | 1.000000 | | | |
| 12 | 182.06720 | 10.000000 | 1.78590 | 44.2 | |
| 13 | −107.53860 | $d_{13}$ | | | |
| 14 | −75.26940 | 7.000000 | 1.48750 | 70.2 | |
| 15 | 247.62240 | $d_{15}$ | | | |
| 16 | ∞ | 2.000000 | 1.51633 | 64.1 | PROTECTIVE GLASS |
| 17 | ∞ | 7.830000 | | | |
| 18 | ∞ | 13.000000 | | | APERTURE PLATE |
| 19 | 78.64780 | 8.000000 | 1.88300 | 40.8 | |
| 20 | −19.94600 | 8.000000 | 1.84666 | 23.8 | |
| 21 | −71.37830 | 6.000000 | | | |
| 22 | −22.06720 | 8.000000 | 1.76182 | 26.5 | |
| 23 | −51.10600 | 10.000000 | 1.78590 | 44.2 | |
| 24 | −29.51420 | 12.000000 | | | |
| 25 | 48.07910 | 10.000000 | 1.76182 | 26.5 | |
| 26 | −23.04400 | 6.000000 | 1.84666 | 23.8 | |
| 27 | 298.03630 | | | | |

TABLE 2

| | TELEPHOTO END | MIDDLE POSITION | WIDE-ANGLE END |
|---|---|---|---|
| $d_4$ | 7.89302 | 12.12966 | 14.83465 |
| $d_{13}$ | 63.31820 | 31.43907 | 14.28199 |
| $d_{15}$ | 6.49377 | 34.13627 | 48.58836 |
| PROJECTION RATIO | 0.2623 | 0.2076 | 0.1845 |

In designing the projection optical system 13, it can be considered that a mechanism for switching fixed focus lenses is adopted as a mechanism for varying a projection ratio in revolver manner, but from the viewpoint of cost and accuracy, it is preferable that varying of projection ratio is performed by using a plurality of lenses which are aligned. By using such a zoom lens in an image recording apparatus, it is possible to satisfy its resolutions and performance and obtain desired resolutions easily.

As shown in FIGS. 4 to 6, after passing through the first lens group 51, zeroth order light passes through the opening of the mirror 32 without being reflected by the mirror 32, and further passes through the second lens group 52 and the third lens group 53 which form a zoom mechanism. The zeroth order light is guided to the fourth lens group 54 without being blocked by the aperture plate 132 in principle, to reach the recording medium 9.

Figure 7:
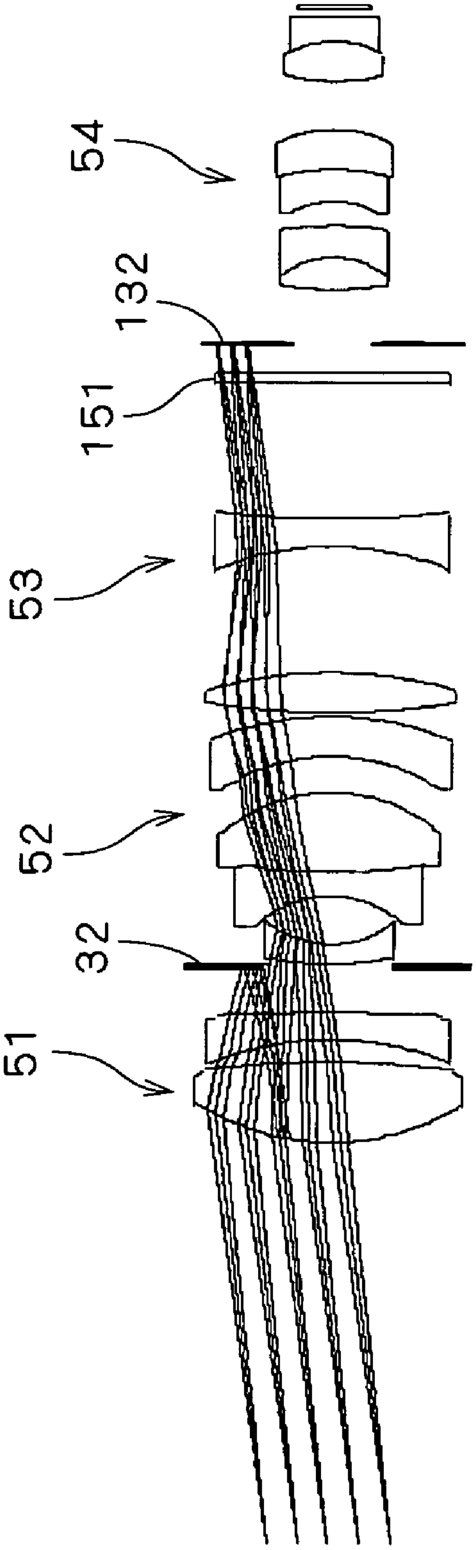
FIG. 7 is a view showing first order diffracted light in the projection optical system.

FIG. 7 shows a state where first order diffracted light enters the projection optical system 13. In FIG. 7, only one of +/− first order diffracted light is shown. As shown in FIG. 7, a part of first order diffracted light entered the first lens group 51 is reflected by the mirror 32 and guided outside the lens barrels 1310, 1330 (see FIG. 2) through the first lens group 51. The reflected part of first order diffracted light is further reflected by the mirror 33 as shown in FIG. 2 and received by the light-block water-cooling jacket 43 outside the lens barrels 1310, 1330, and heat generated by light receiving is removed. To guide the light outside the lens barrels 1310, 1330, it is preferable that the first lens group 51 between the SLM 12 and the mirror 32 has positive power and each lens of the first lens group 51 has enough size to receive all the first order diffracted light from the SLM 12. From the view point of easy design, it is more preferable that the lens 511 closest to the SLM 12 has a size covering the SLM 12 (i.e., a size of parallel projection of the SLM 12 onto the lens 511 along the optical axis). Through such construction, it is possible to stably prevent the first order diffracted light from being applied to the inner surfaces of the lens barrels 1310, 1330 with a simple structure. The first lens group 51 may be one lens.

A part of first order diffracted light passed through the opening of the mirror 32 is guided to the aperture plate 132 without being vignetted by the second lens group 52 and the third lens group 53 (i.e., without deviating from the lenses) located between the mirror 32 and the aperture plate 132. This prevents heat generation and heat deformation caused by light blocking in the vicinity of the second lens group 52 and the third lens group 53. Since the cooling mechanism 152 is attached to the aperture plate 132 as discussed above, it is possible to efficiently remove heat generated by applying the first order diffracted light to the aperture plate 132 and prevent transfer of heat to surrounding constituents. As the projection optical system 13, by locating at least one lens between the mirror 32 and the aperture plate 132, it becomes possible to easily design for preventing luminous flux limited by the mirror 32 from being vignetted by at least the one lens.

Normally, it is not easy to efficiently remove heat generated by complex irradiation of non-signal light (first order diffracted light) in a narrow space of a projection optical system. In particular, this is extremely difficult when a size of a projection optical system is reduced. It is not impossible to form a high cooling structure by using micromachining technique for micromachines, but this cannot be used for a printing apparatus or plate-making apparatus because of high cost. Conversely, in the projection optical system 13 in accordance with the preferred embodiment, since it is possible to remove heat generated by light blocking efficiently by using the mirrors 32, 33 and the light-block water-cooling jacket 43 and the luminous flux of the first order diffracted light passed through the mirror 32 is limited by partial light blocking by the mirror 32, this prevents heat generation by being vignetted by the second lens group 52 and the third lens group 53. Further, since the rest of the first order diffracted light is blocked by the aperture plate 132, it becomes possible to easily remove heat generated by blocking the light which reaches the aperture plate 132. As a result, it is possible to satisfy required optical performance by optimization of the optical system and ensure consistent quality of image recording (i.e., imaging by light) by the image recording apparatus 1.

Since the aperture plate 132 is located at a position among the plurality of lenses (the first to fourth lens groups 51 to 54) of the projection optical system 13, by blocking the light by the aperture plate 132, it is possible to block the first order diffracted light surely with separating the zeroth order light and the first order diffracted light accurately.

Next, explanation will be made on the characteristic feature of the projection optical system 13. As discussed above, the projection optical system 13 is a both-side telecentric system, that is, back focus of lens groups between the aperture plate 132 and the object (front side) and front focus of a lens group between the aperture plate 132 and the image (back side) coincide with each other. This makes a principal ray forming an image parallel to the optical axis, and effects on consistent quality of image recording caused by variation of a length between the object and the image are decreased. In a case where the principal ray is parallel to the optical axis, since lights from each of the light modulator elements are diff-used light, the lens 511 closest to the object needs to have a size covering the SLM 12 (i.e., a size larger than a range of parallel projection of the SLM 12) for receiving all of the first order diffracted light.

Since the SLM 12 is reflection type, illumination light needs to enter from behind the lens 511 to the SLM 12, and further in the GLV, an incident angle of illumination light is limited in its specification. As discussed above, since it is necessary that the lens 511 has a size covering the SLM 12 and irradiation of illumination light is not prevented by the lens 511, a length (object length) between the SLM 12 and the lens 511 is made relatively long. In a case of the larger lens 511 and a long object length, it is necessary to suppress aberration such as spherical aberration or the like, and thus in the projection optical system 13, at least one lens of the first lens group 51 has a doublet structure (the first lens group 51 may be composed of three or more lenses).

A composite focal length of the first lens group 51 is made relatively short and an aperture of the second lens group 52 is made relatively large in consideration of effects of various aberrations. With this structure, the first order diffracted light can pass through the second lens group 52 and the third lens group 53 easily, and it is possible to easily prevent the first order diffracted light inclining largely with respect to the optical axis from being vignetted in the lens barrel 1310 and heat generation.

Specifically, in the projection optical system 13 of FIG. 4, the maximum aperture AP1 of lenses which are included in the first lens group 51 closest to the SLM 12 is 31 (as shown in Table 1, a length between the SLM 12 and a surface of the first lens is 100), the maximum aperture AP2 of lenses between the first lens group 51 and the aperture plate 132 is 29, and (AP1/AP2) is about 1.1. Under this condition, it becomes possible to easily design for preventing the first order diffracted light passed through the first lens group 51 and the mirror 32 from being vignetted by lenses between the mirror 32 and the aperture plate 132.

A length L1 between the SLM 12 and the recording medium 9 is 400, a length L2 between the SLM 12 and the lens 511 closest to the SLM 12 is 100, and (L1/L2) is 4.0. By ensuring the object length to some degree with respect to the length between the object and the image in the projection optical system 13, it is possible to easily avoid interference between the light applied to the SLM 12 and the projection optical system 13.

Total power of the second lens group 52 and the third lens group 53 is negative, and this makes an entire length of the projection optical system 13 shorter. As discussed above, by movement of these lens groups, varying of the projection ratio is performed.

Since the lens 531 (i.e., the third lens group 53) between the aperture plate 132 and the SLM 12 has negative power, it is possible to easily guide the light to the fourth lens group 54 between the aperture plate 132 and the recording medium 9 and constitute a lens system which is so-called retrofocus type by the third lens group 53 and the fourth lens group 54. This makes it possible to shorten the entire length of the projection optical system 13 and design a zoom lens easily.

Naturally, the design example shown in Tables 1 and 2 is made in consideration of a realistic length between the object and the image in the projection optical system 13, an image length between the lens closest to the image and the recording medium 9, brightness (numerical aperture), various specifications such as a projection ratio or the like, aberration correction, and an allowable range of resolving power (mainly, MTF (Modulation Transfer Function) or wavefront aberration). The design example also considers durability against a high-power laser, the number of lenses, the limit of the number of laminated surfaces in consideration of effects of heat, and restriction depending on antireflection coating or the like.

Figure 8:
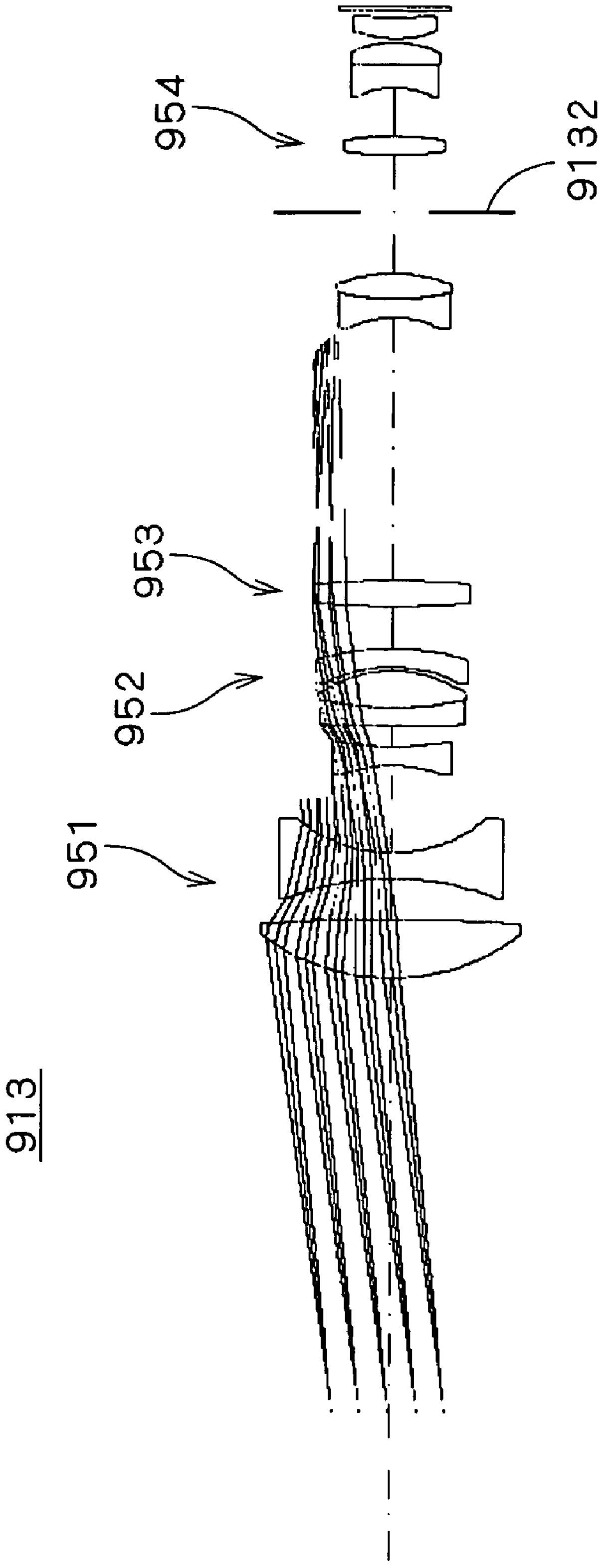
FIG. 8 is a plan view showing a projection optical system in accordance with a comparison example.

FIG. 8 is a view showing a comparison example of a projection optical system 913 which is designed without consideration of the above design principle. In the projection optical system 913, provided are a first lens group 951 having two lenses, a second lens group 952 having four lenses, a third lens group 953 having one lens, and a fourth lens group 954 having six lenses. An aperture plate 9132 is located among lenses of the fourth lens group 954.

FIG. 8 shows a state where first order diffracted light enters the projection optical system 913. Incident light stuck out largely from the first lens of the second lens group 952, vignetting occurs, and thereafter, the light is gradually vignetted. Light stuck out from lenses is blocked by a side surface of a lens barrel or portions (generally made of metal) for supporting lenses, and an inside space of the lens barrel is heated complicatedly. Rise of temperature in the lens barrel changes positions of lenses which are adjusted precisely, or causes eccentricity of lenses. As a result, deterioration or instability of image quality and instability of writing quality caused by change of temperature occur.

Conversely, in the projection optical system 13 shown in FIG. 4, it is possible to satisfy required optical performance while removing heat caused by light blocking easily and ensure consistent quality of image recording by optimization of the optical system.

Figure 9:
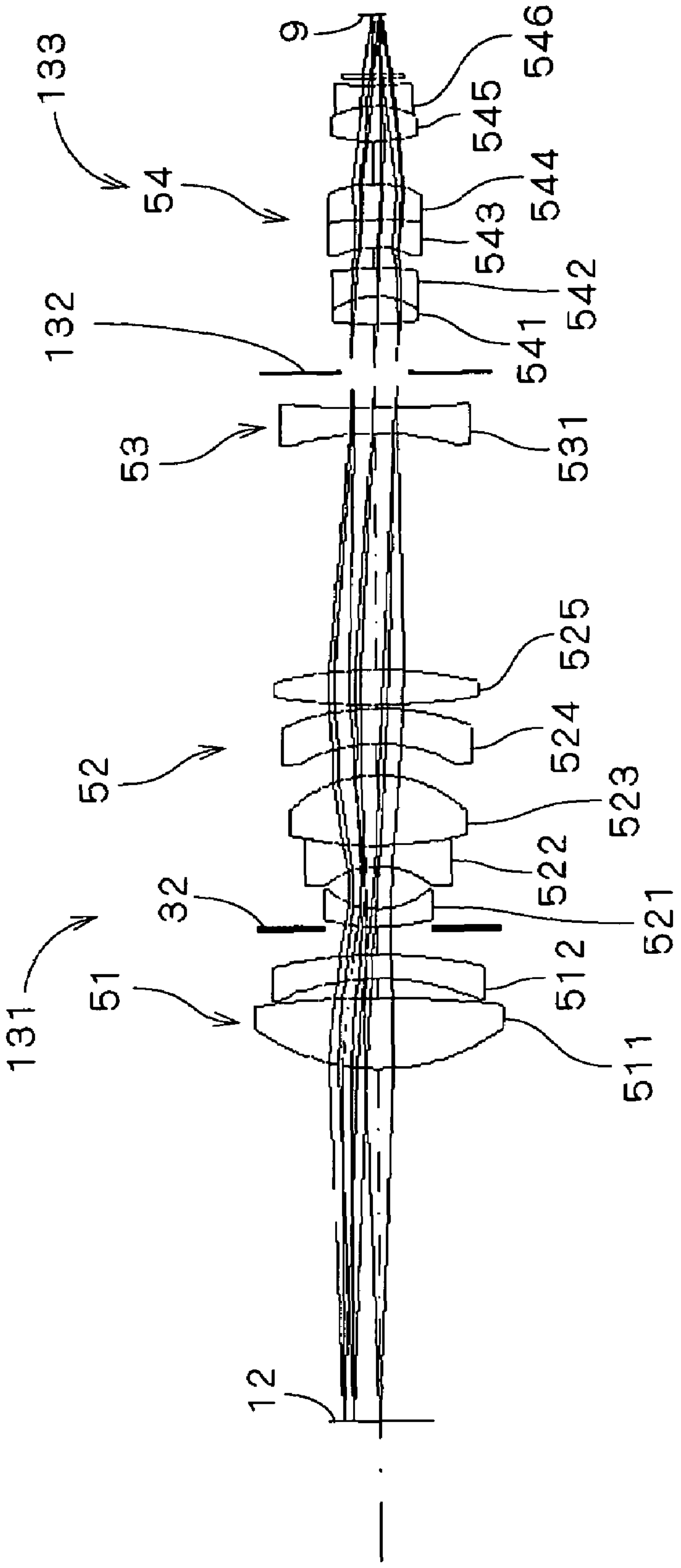
FIG. 9 is a plan view showing another example of a projection optical system.
Figure 10:
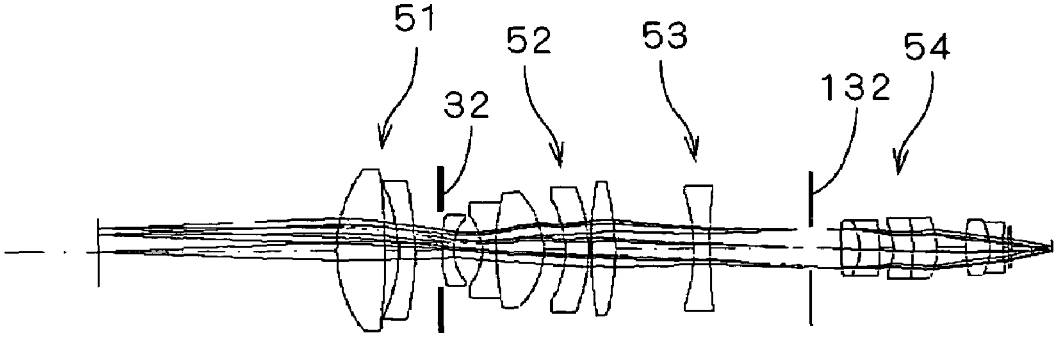
FIG. 10 is a plan view showing the projection optical system after a projection ratio is varied.
Figure 11:
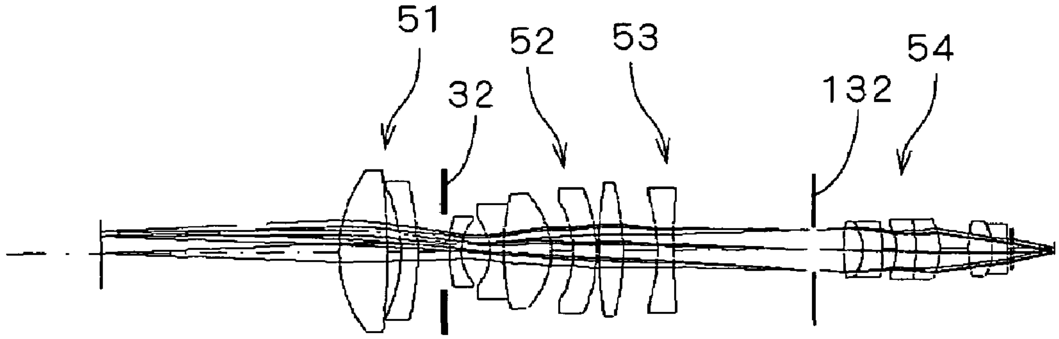
FIG. 11 is a plan view showing the projection optical system after a projection ratio is varied.

FIG. 9 is a plan view showing another example of the projection optical system 13. The projection optical system 13 comprises, as in FIG. 4, the first optical system 131, the aperture plate 132, and the second optical system 133 provided in this order from the SLM 12. The mirror 32 is provided in the first optical system 131. The protective glass 151 is omitted. It is noted that the lens barrels 1310, 1330 and the cooling mechanism 152 (see FIG. 2) for the aperture plate 132 are not drawn in FIG. 9. Basic shape of each lens is the same as that in FIG. 4, and the same reference signs as those in FIG. 4 are used. FIG. 9 shows the projection optical system 13 at a telephoto end. FIGS. 10 and 11 respectively show the projection optical system 13 at a middle position and a wide-angle end. As shown in FIGS. 9 to 11, when a projection ratio is varied, the second lens group 52 and the third lens group 53 move along the optical axis. Surface numbers, radiuses of curvature, distances between surfaces, refractive indexes, and Abbe numbers which are from the object side are as shown in Table 3, and a distance $d_4$ between surfaces, a distance $d_{13}$ between surfaces, a distance $d_{15}$ between surfaces, and a projection ratio are as shown in Table 4, where a wavelength of light is 808 nm and a numerical aperture NA on the object side is 0.04.

TABLE 3

| SURFACE NUMBER | RADIUS OF CURVATURE | DISTANCE BETWEEN SURFACES | REFRACTIVE INDEX | ABBE NUMBER | NOTE |
|---|---|---|---|---|---|
| 0 | ∞ | 100.000000 | | | OBJECT SURFACE |
| 1 | 58.42623 | 20.000000 | 1.88300 | 40.8 | |
| 2 | −281.96988 | 5.500000 | | | |
| 3 | −68.06598 | 7.000000 | 1.48750 | 70.2 | |
| 4 | −127.44183 | $d_4$ | | | |
| 5 | 54.71311 | 5.000000 | 1.75520 | 27.5 | |
| 6 | 20.96039 | 12.000000 | | | |
| 7 | −23.56193 | 6.000000 | 1.84666 | 23.8 | |
| 8 | 100.00000 | 20.000000 | 1.88300 | 40.8 | |
| 9 | −35.08896 | 9.000000 | | | |
| 10 | −45.00000 | 10.000000 | 1.88300 | 40.8 | |
| 11 | −70.00000 | 1.000000 | | | |
| 12 | 168.74807 | 10.000000 | 1.78590 | 44.2 | |

TABLE 3-continued

| SURFACE NUMBER | RADIUS OF CURVATURE | DISTANCE BETWEEN SURFACES | REFRACTIVE INDEX | ABBE NUMBER | NOTE |
|---|---|---|---|---|---|
| 13 | −121.10943 | $d_{13}$ | | | |
| 14 | −81.81975 | 7.000000 | 1.48749 | 70.2 | |
| 15 | 264.12677 | $d_{15}$ | | | |
| 16 | ∞ | 13.000000 | | | APERTURE PLATE |
| 17 | 74.99309 | 8.000000 | 1.88300 | 40.8 | |
| 18 | −20.90134 | 8.000000 | 1.84666 | 23.8 | |
| 19 | −87.85685 | 6.000000 | | | |
| 20 | −23.46983 | 8.000000 | 1.75520 | 27.5 | |
| 21 | −74.14418 | 10.000000 | 1.78590 | 44.2 | |
| 22 | −30.91342 | 12.000000 | | | |
| 23 | 43.02417 | 10.000000 | 1.75520 | 27.5 | |
| 24 | −24.57235 | 6.000000 | 1.84666 | 23.8 | |
| 25 | 208.18800 | | | | |

TABLE 4

| | TELEPHOTO END | MIDDLE POSITION | WIDE-ANGLE END |
|---|---|---|---|
| $d_4$ | 8.00000 | 11.01438 | 13.20689 |
| $d_{13}$ | 67.48332 | 33.06092 | 14.25851 |
| $d_{15}$ | 10.93374 | 42.38637 | 59.11434 |
| PROJECTION RATIO | 0.2622 | 0.2076 | 0.1845 |

As shown in FIGS. 9 to 11, after passing through the first lens group 51, zeroth order light passes through the opening of the mirror 32 without being reflected by the mirror 32, and further passes through the second lens group 52 and the third lens group 53. The zeroth order light is guided to the fourth lens group 54 without being blocked by the aperture plate 132 in principle, to reach the recording medium 9.

Figure 12:
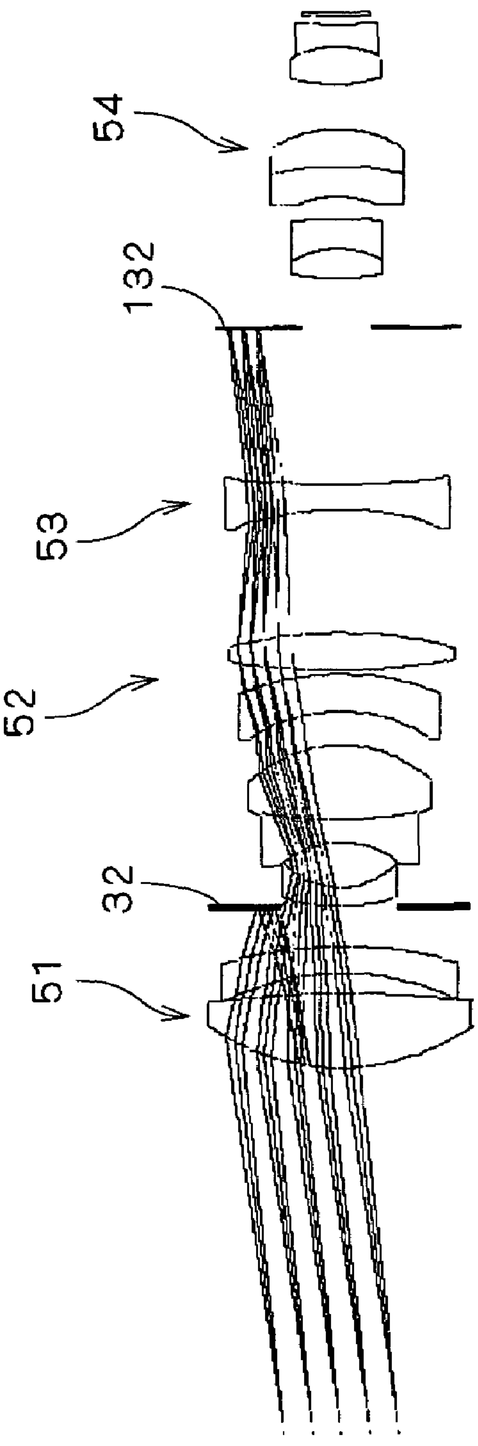
FIG. 12 is a view showing first order diffracted light in the projection optical system.

FIG. 12 shows a state where first order diffracted light enters the projection optical system 13. As in FIG. 7, a part of first order diffracted light entered the first lens group 51 is reflected by the mirror 32, passes through the first lens group 51 again, to be reflected by the mirror 33 as shown in FIG. 2 and guided to the light-block water-cooling jacket 43. A part of the first order diffracted light passed through the opening of the mirror 32 is guided to the aperture plate 132 without being vignetted by the second lens group 52 and the third lens group 53, and this prevents heat generation and heat deformation caused by light blocking in the vicinity of the second lens group 52 and the third lens group 53. The cooling mechanism 152 removes heat generated by applying the first order diffracted light to the aperture plate 132 efficiently, to thereby prevent transfer of heat to surrounding constituents. As a result, it is possible to ensure consistent quality of image recording (i.e., imaging by light) by the image recording apparatus 1.

A composite focal length of the first lens group 51 is made relatively short and an aperture of the second lens group 52 is made relatively large in consideration of effects of various aberrations. With this structure, the first order diffracted light can pass through the second lens group 52 and the third lens group 53 easily and it is possible to easily prevent the first order diffracted light inclining largely with respect to the optical axis from being vignetted in the lens barrel 1310 and heat generation.

In FIG. 9, the maximum aperture AP1 of lenses which are included in the first lens group 51 is 33 (a length between the SLM 12 and a surface of the first lens is 100), the maximum aperture AP2 of lenses between the first lens group 51 and the aperture plate 132 is 28, and (AP1/AP2) is about 1.2. Under this condition, it becomes possible to easily design for preventing the first order diffracted light passed through the first lens group 51 from being vignetted by lenses between the first lens group 51 and the aperture plate 132.

A length L1 between the SLM 12 and the recording medium 9 is 400, a length L2 between the SLM 12 and the lens 511 is 100, and (L1/L2) is 4.0. With this structure, it is possible to easily avoid interference between the light applied to the SLM 12 and the projection optical system 13. Other characteristic feature of the projection optical system 13 of FIG. 9 is the same as those in FIG. 4.

Figure 13:
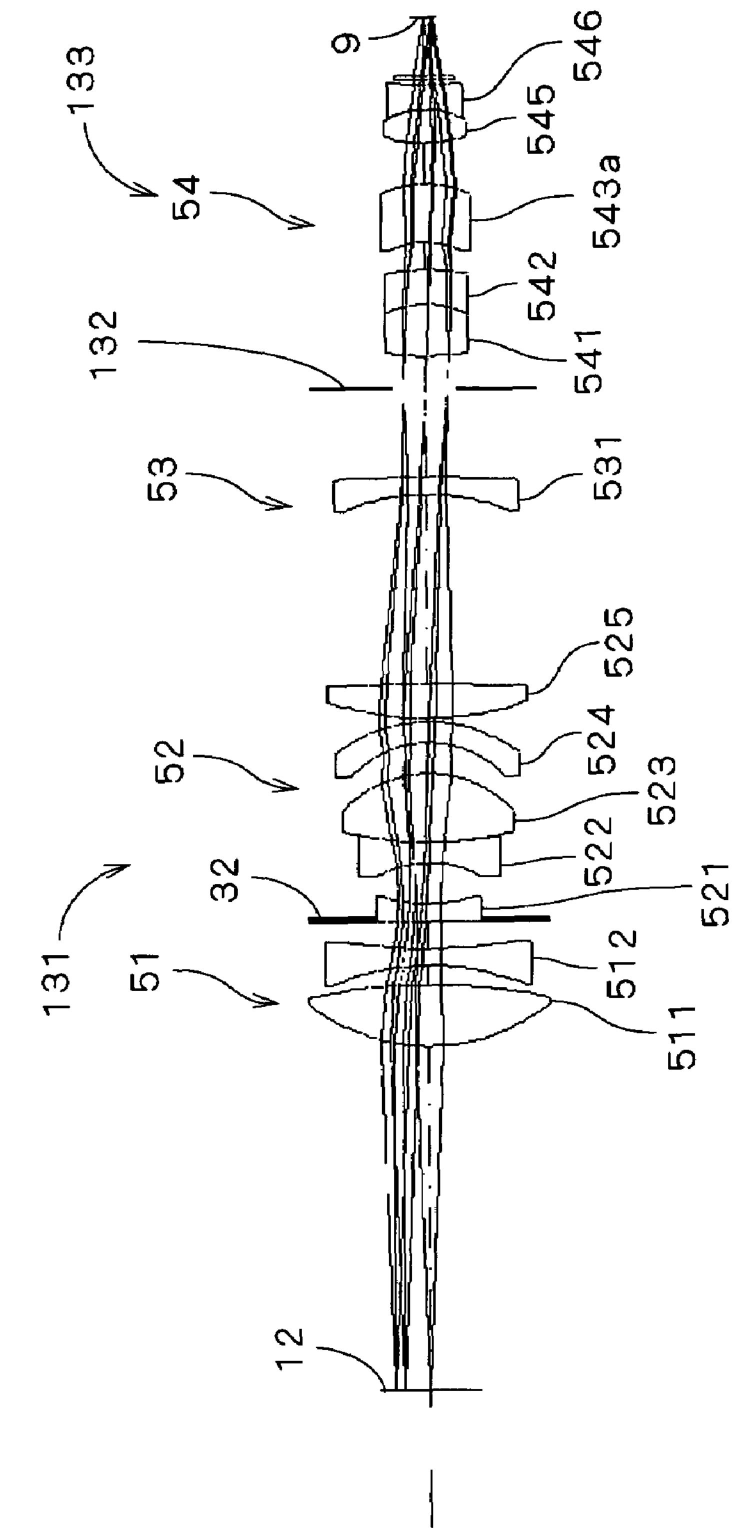
FIG. 13 is a plan view showing still another example of a projection optical system.
Figure 14:
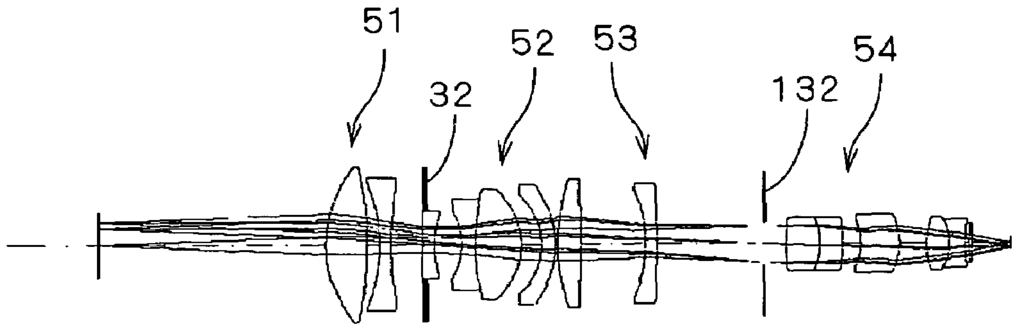
FIG. 14 is a plan view showing the projection optical system after a projection ratio is varied.
Figure 15:
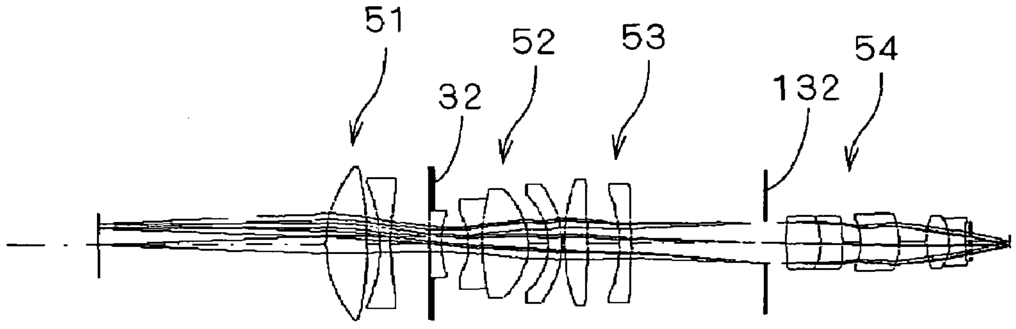
FIG. 15 is a plan view showing the projection optical system after a projection ratio is varied.

FIG. 13 is a plan view showing still another example of the projection optical system 13. The projection optical system 13 comprises, as in FIG. 4, the first optical system 131, the aperture plate 132, and the second optical system 133 provided in this order from the SLM 12. The mirror 32 is provided in the first optical system 131. The protective glass 151 is omitted. It is noted that the lens barrels 1310, 1330 and the cooling mechanism 152 (see FIG. 2) for the aperture plate 132 are not drawn in FIG. 13. Though basic shape of each lens is the same as that in FIG. 4 and the same reference signs as those in FIG. 4 are used, this example is different from the case of FIG. 4 in that the lens 543 and the lens 544 of the fourth lens group 54 are replaced with one meniscus lens 543*a* which is convex toward the image side. FIG. 13 shows the projection optical system 13 at a telephoto end. FIGS. 14 and 15 respectively show the projection optical system 13 at a middle position and a wide-angle end. As shown in FIGS. 13 to 15, when a projection ratio is varied, the second lens group 52 and the third lens group 53 move along the optical axis. Surface numbers, radiuses of curvature, distances between surfaces, refractive indexes, and Abbe numbers which are from the object side are as shown in Table 5, and a distance $d_4$ between surfaces, a distance $d_{13}$ between surfaces, a distance $d_{15}$ between surfaces, and a projection ratio are as shown in Table 6, where a wavelength of light is 808 nm and a numerical aperture NA on the object side is 0.04.

TABLE 5

| SURFACE NUMBER | RADIUS OF CURVATURE | DISTANCE BETWEEN SURFACES | REFRACTIVE INDEX | ABBE NUMBER | NOTE |
|---|---|---|---|---|---|
| 0 | ∞ | 100.000000 | | | OBJECT SURFACE |
| 1 | 54.77033 | 18.000000 | 1.88300 | 40.8 | |
| 2 | −158.96328 | 5.500000 | | | |
| 3 | −70.99911 | 5.000000 | 1.48749 | 70.2 | |
| 4 | 148.31955 | $d_4$ | | | |
| 5 | −220.31913 | 5.000000 | 1.75520 | 27.5 | |
| 6 | 41.92491 | 12.000000 | | | |
| 7 | −29.96856 | 6.000000 | 1.84666 | 23.8 | |
| 8 | 100.00000 | 20.000000 | 1.88300 | 40.8 | |
| 9 | −33.25035 | 9.000000 | | | |
| 10 | −29.71933 | 6.000000 | 1.84666 | 23.8 | |
| 11 | −43.75692 | 1.000000 | | | |
| 12 | 85.81193 | 10.000000 | 1.83481 | 42.7 | |
| 13 | −599.34433 | $d_{13}$ | | | |
| 14 | −61.80285 | 5.000000 | 1.74320 | 49.3 | |
| 15 | −484.0468 | $d_{15}$ | | | |
| 16 | ∞ | 9.000000 | | | APERTURE PLATE |
| 17 | 90.24721 | 15.000000 | 1.83481 | 42.7 | |
| 18 | −25.86462 | 10.000000 | 1.84666 | 23.8 | |
| 19 | −63.34011 | 8.000000 | | | |
| 20 | −22.91319 | 17.000000 | 1.84666 | 23.8 | |
| 21 | −29.46887 | 12.000000 | | | |
| 22 | 34.04957 | 10.000000 | 1.78590 | 44.2 | |
| 23 | −21.79594 | 7.000000 | 1.84666 | 23.8 | |
| 24 | 63.52071 | | | | |

TABLE 6

| | TELEPHOTO END | MIDDLE POSITION | WIDE-ANGLE END |
|---|---|---|---|
| $d_4$ | 8.00000 | 13.88334 | 16.94493 |
| $d_{13}$ | 55.29615 | 28.23465 | 14.00000 |
| $d_{15}$ | 26.30385 | 47.34254 | 58.58423 |
| PROJECTION RATIO | 0.2622 | 0.2076 | 0.1845 |

As shown in FIGS. 13 to 15, after passing through the first lens group 51, zeroth order light passes through the opening of the mirror 32 without being reflected by the mirror 32, and further passes through the second lens group 52 and the third lens group 53. The zeroth order light is guided to the fourth lens group 54 without being blocked by the aperture plate 132 in principle, to reach the recording medium 9.

Figure 16:
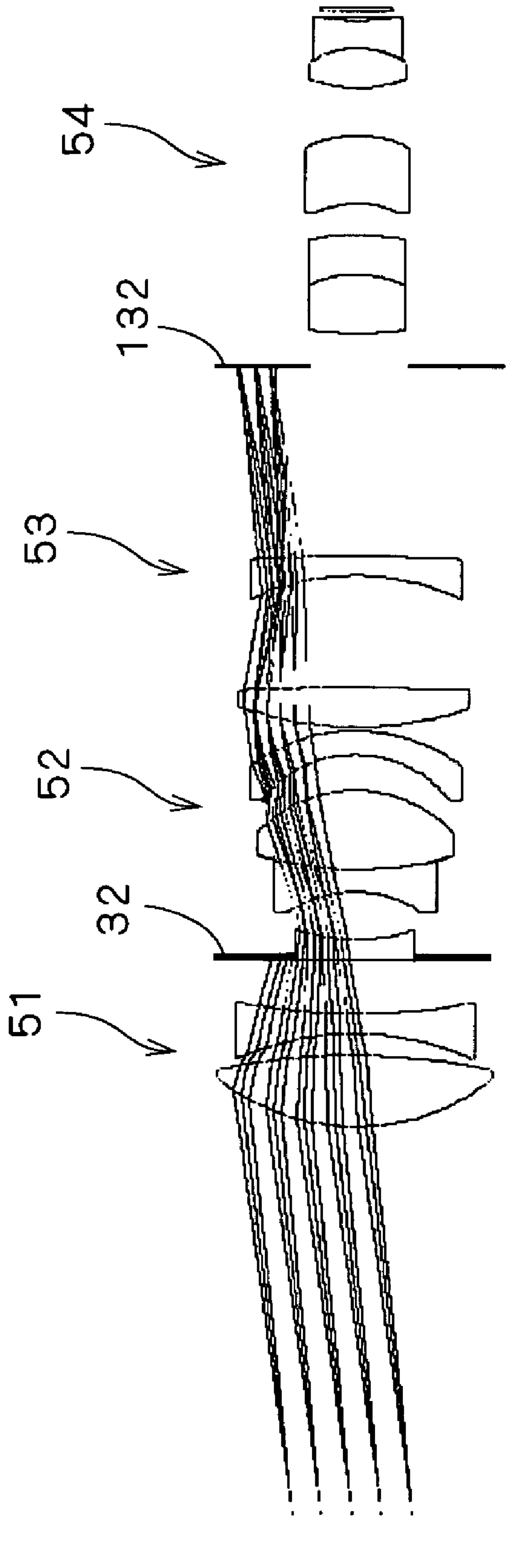
FIG. 16 is a view showing first order diffracted light in the projection optical system.

FIG. 16 shows a state where first order diffracted light enters the projection optical system 13. As in FIG. 7, a part of first order diffracted light entered the first lens group 51 is reflected by the mirror 32, passes through the first lens group 51 again, to be reflected by the mirror 33 as shown in FIG. 2 and guided to the light-block water-cooling jacket 43. A part of the first order diffracted light passed through the opening of the mirror 32 is guided to the aperture plate 132 without being vignetted by the second lens group 52 and the third lens group 53 and this prevents heat generation and heat deformation caused by light blocking in the vicinity of the second lens group 52 and the third lens group 53. The cooling mechanism 152 removes heat generated by applying the first order diffracted light to the aperture plate 132 efficiently, to thereby prevent transfer of heat to surrounding constituents. As a result, it is possible to ensure consistent quality of image recording (i.e., imaging by light) by the image recording apparatus 1.

As in the projection optical system 13 of FIG. 13, a composite focal length of the first lens group 51 is made relatively short and an aperture of the second lens group 52 is made relatively large in consideration of effects of various aberrations. With this structure, the first order diffracted light can pass through the second lens group 52 and the third lens group 53 easily and it is possible to easily prevent the first order diffracted light inclining largely with respect to the optical axis from being vignetted in the lens barrel 1310 and heat generation.

The maximum aperture AP1 of lenses which are included in the first lens group 51 is 33 (a length between the SLM 12 and a surface of the first lens is 100), the maximum aperture AP2 of lenses between the first lens group 51 and the aperture plate 132 is 27, and (AP1/AP2) is about 1.2. Under this condition, it becomes possible to easily design for preventing the first order diffracted light passed through the first lens group 51 from being vignetted by lenses between the first lens group 51 and the aperture plate 132.

A length L1 between the SLM 12 and the recording medium 9 is 400, a length L2 between the SLM 12 and the lens 511 is 100, and (L1/L2) is 4.0. With this structure, it is possible to easily avoid interference between the light applied to the SLM 12 and the projection optical system 13. Other characteristic feature of the projection optical system 13 of FIG. 13 is the same as those in FIG. 4.

Figure 17:
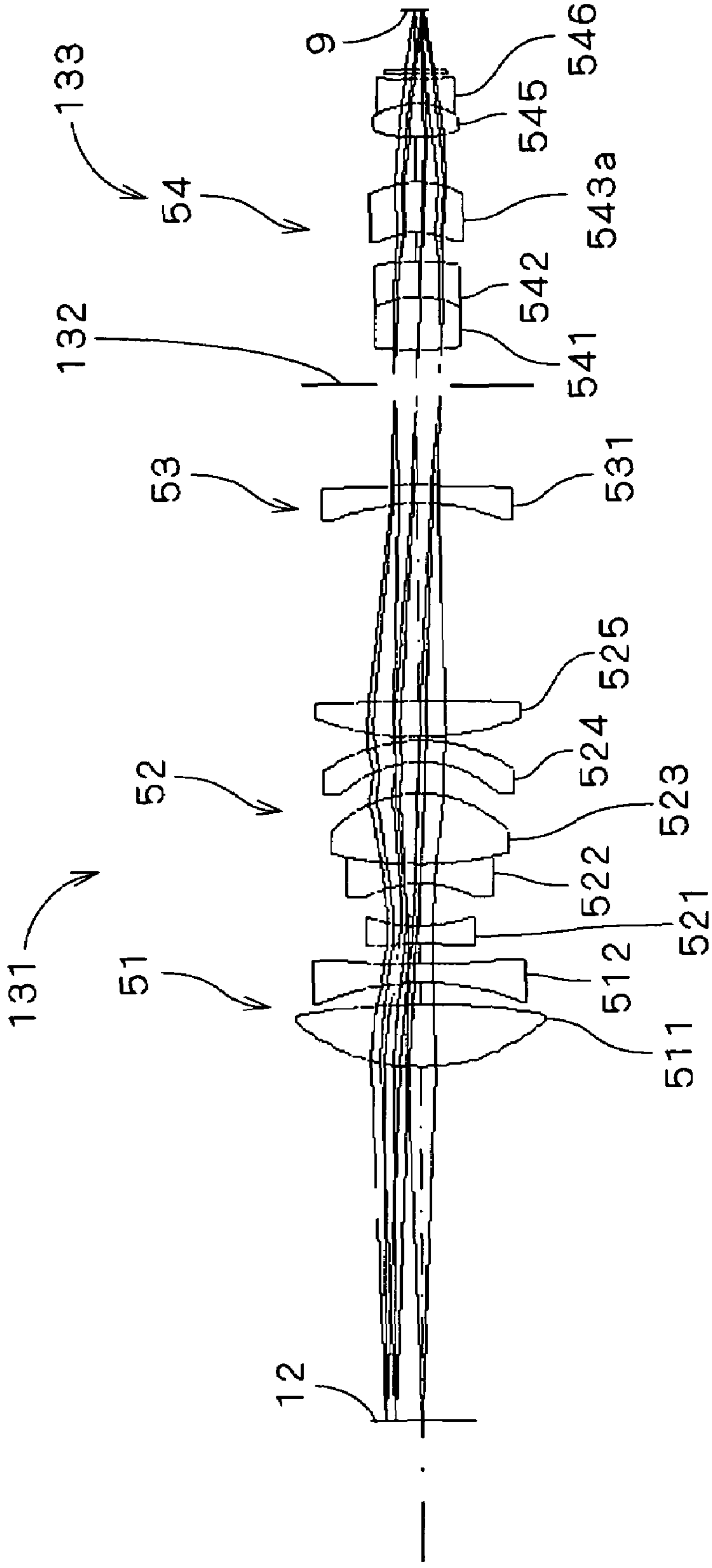
FIG. 17 is a plan view showing still another example of a projection optical system.
Figure 18:
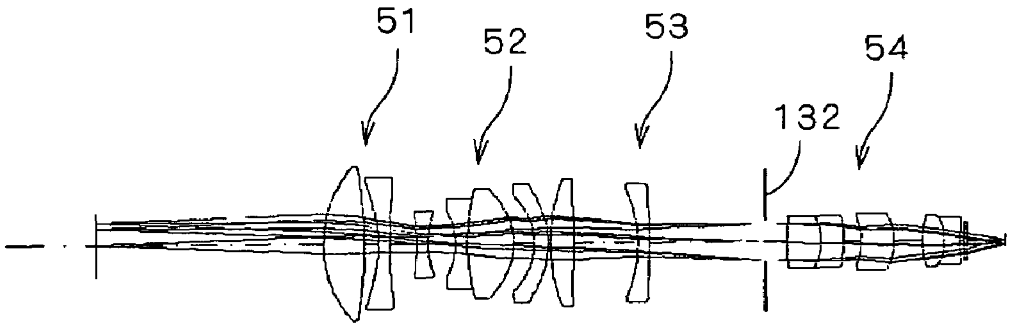
FIG. 18 is a plan view showing the projection optical system after a projection ratio is varied.
Figure 19:
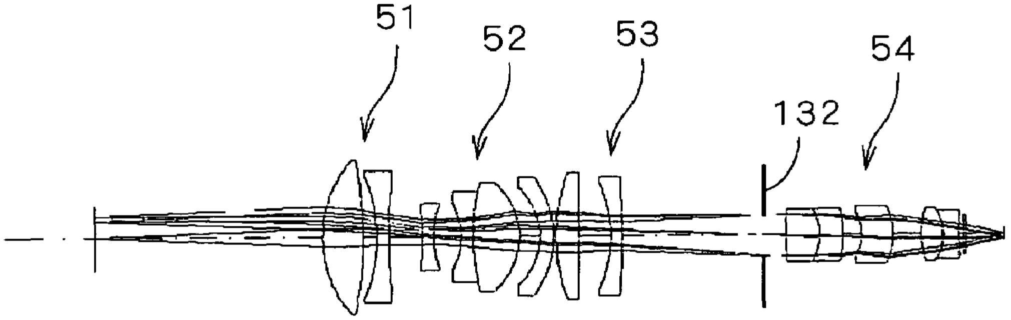
FIG. 19 is a plan view showing the projection optical system after a projection ratio is varied.

FIG. 17 is a plan view showing still another example of the projection optical system 13. The projection optical system 13 comprises, as in FIG. 4, the first optical system 131, the aperture plate 132, and the second optical system 133 provided in this order from the SLM 12. Though the aperture plate 132 is located at a position among the plurality of lenses of the projection optical system 13, this example is different from the case of FIG. 4 in that the mirror 32 is not provided in the first optical system 131. The protective glass 151 is also omitted. It is noted that the lens barrels 1310, 1330 and the cooling mechanism 152 for the aperture plate 132 are not drawn in FIG. 17. Basic shape of each lens is the same as that in FIG. 13, and the same reference signs as those in FIG. 13 are used. FIG. 17 shows the projection optical system 13 at a telephoto end. FIGS. 18 and 19 respectively show the projection optical system 13 at a middle position and a wide-angle end. As shown in FIGS. 17 to 19, when varying of a projection ratio is performed, the second lens group 52 and the third lens group 53 move along the optical axis. Surface numbers, radiuses of curvature, distances between surfaces, refractive indexes, and Abbe numbers which are from the object side are as shown in Table 7, and a distance $d_4$ between surfaces, a distance $d_{13}$ between surfaces, a distance $d_{15}$ between surfaces, and a projection ratio are as shown in Table 8, where a wavelength of light is 808 nm and a numerical aperture NA on the object side is 0.04.

TABLE 7

| SURFACE NUMBER | RADIUS OF CURVATURE | DISTANCE BETWEEN SURFACES | REFRACTIVE INDEX | ABBE NUMBER | NOTE |
|---|---|---|---|---|---|
| 0 | ∞ | 100.000000 | | | OBJECT SURFACE |
| 1 | 53.21361 | 18.000000 | 1.88300 | 40.8 | |
| 2 | −179.34612 | 6.152998 | | | |
| 3 | −71.86484 | 5.000000 | 1.48749 | 70.2 | |
| 4 | 196.88800 | $d_4$ | | | |
| 5 | −114.95618 | 5.000000 | 1.75520 | 27.5 | |
| 6 | 40.19478 | 12.000000 | | | |
| 7 | −33.54305 | 5.556780 | 1.84666 | 23.8 | |
| 8 | 100.00000 | 20.000000 | 1.88300 | 40.8 | |
| 9 | −33.52002 | 9.000000 | | | |
| 10 | −30.60796 | 6.185195 | 1.84666 | 23.8 | |
| 11 | −45.01674 | 1.000000 | | | |
| 12 | 81.36870 | 10.000000 | 1.83481 | 42.7 | |
| 13 | −1349.75200 | $d_{13}$ | | | |
| 14 | −60.98415 | 5.000000 | 1.74320 | 49.3 | |
| 15 | −400.55999 | $d_{15}$ | | | |
| 16 | ∞ | 9.000000 | | | APERTURE PLATE |
| 17 | 86.95238 | 15.000000 | 1.83481 | 42.7 | |
| 18 | −26.63944 | 10.000000 | 1.84666 | 23.8 | |
| 19 | −72.27246 | 8.147820 | | | |
| 20 | −22.95304 | 14.226586 | 1.84666 | 23.8 | |
| 21 | −28.56263 | 12.648992 | | | |
| 22 | 33.99984 | 9.647592 | 1.78590 | 44.2 | |
| 23 | −22.48762 | 6.826858 | 1.84666 | 23.8 | |
| 24 | 72.89827 | | | | |

TABLE 8

| | TELEPHOTO END | MIDDLE POSITION | WIDE-ANGLE END |
|---|---|---|---|
| $d_4$ | 6.00000 | 11.77554 | 14.76139 |
| $d_{13}$ | 56.32832 | 28.59748 | 14.00000 |
| $d_{15}$ | 29.37886 | 51.13416 | 62.79149 |
| PROJECTION RATIO | 0.2622 | 0.2076 | 0.1845 |

As shown in FIGS. 17 to 19, after passing through the first lens group 51, zeroth order light passes through the second lens group 52 and the third lens group 53, to be guided to the fourth lens group 54 without being blocked by the aperture plate 132 in principle, to reach the recording medium 9.

Figure 20:
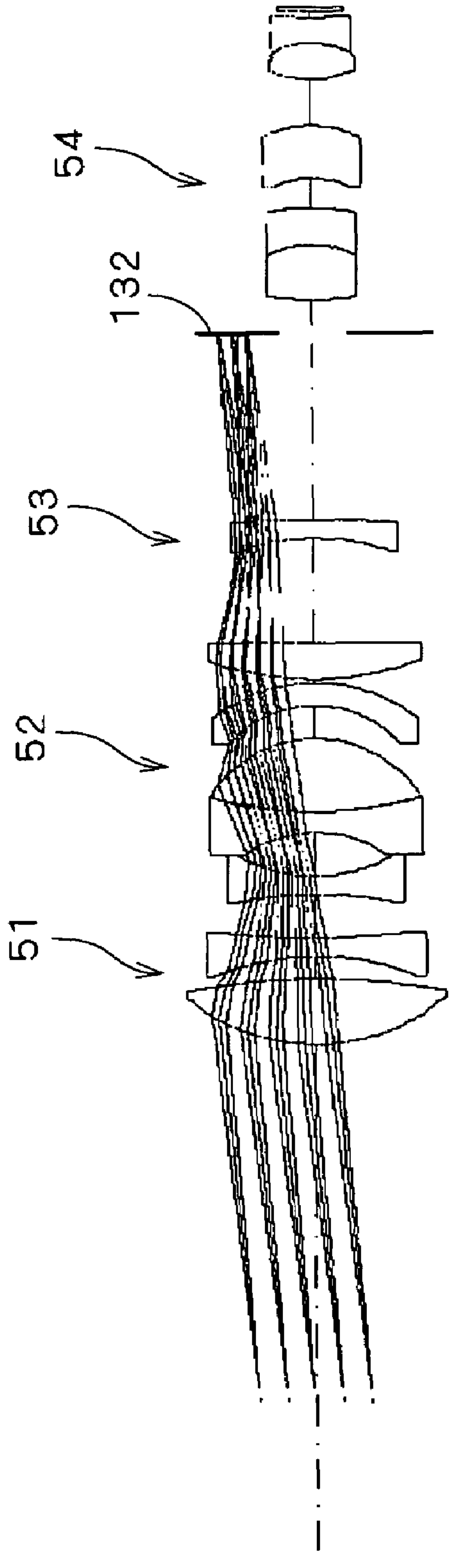
FIG. 20 is a view showing first order diffracted light in the projection optical system.

FIG. 20 shows a state where first order diffracted light enters the projection optical system 13. Though the mirror 32 is not provided in the projection optical system 13, all the first order diffracted light passed through the first lens group 51 passes through the second lens group 52 and the third lens group 53 without being vignetted, to be guided to the aperture plate 132. This prevents heat generation and heat deformation caused by light blocking in the vicinity of the second lens group 52 and the third lens group 53. The cooling mechanism 152 removes heat generated by applying the first order diffracted light to the aperture plate 132 easily and efficiently, to thereby prevent transfer of heat to surrounding constituents. As a result, as in the projection optical system 13 of FIG. 4, it is possible to ensure consistent quality of image recording (i.e., imaging by light) in the image recording apparatus 1.

As in the projection optical system 13 of FIG. 17, a composite focal length of the first lens group 51 is made relatively short and an aperture of the second lens group 52 is made relatively large in consideration of effects of various aberrations. With this structure, the first order diffracted light can pass through the second lens group 52 and the third lens group 53 easily and it is possible to easily prevent the first order diffracted light inclining largely with respect to the optical axis from being vignetted in the lens barrel 1310 and heat generation.

The maximum aperture AP1 of lenses which are included in the first lens group 51 is 33 (a length between the SLM 12 and a surface of the first lens is 100), the maximum aperture AP2 of lenses between the first lens group 51 and the aperture plate 132 is 27, and (AP1/AP2) is about 1.2. Under this condition, it becomes possible to easily design for preventing the first order diffracted light passed through the first lens group 51 from being vignetted by lenses between the first lens group 51 and the aperture plate 132.

A length L1 between the SLM 12 and the recording medium 9 is 400, a length L2 between the SLM 12 and the lens 511 is 100, and (L1/L2) is 4.0, and thus it is possible to easily avoid interference between the light applied to the SLM 12 and the projection optical system 13. Other characteristic feature of the projection optical system 13 of FIG. 17 is the same as those in FIG. 4 except that the mirror 32 is omitted.

Though the preferred embodiment of the present invention has been discussed above, the present invention is not limited to the above-discussed preferred embodiment, but allows various variations.

The light source is not limited to the semiconductor laser and may be other light source such as a lamp or the like. Especially, in a case of a light source with high power, it is preferable to use a technique for preventing vignetting of first order diffracted light in the lens barrel of the projection optical system 13.

In a mechanism for scanning zeroth order light on the recording medium 9, instead of rotation of the holding drum 7 and movement of the optical head 10, for example, the recording medium 9 is held on a plane and scanning may be performed two-dimensionally by moving a holding part and an optical head relatively.

As discussed above, though in the preferred embodiment, the lens barrel of the projection optical system 13 is formed by combination of two portions (the lens barrels 1310, 1330), the lens barrel may be one portion or more than three. In the preferred embodiment, the aperture plate 132 is exactly located outside the lens barrels 1310, 1330, but if the lens barrels 1310, 1330 are regarded as one lens barrel, the aperture plate 132 is substantially located inside the lens barrel, and the mirror 32 and the aperture plate 132 (or the aperture plate 132) are a member(s) for performing light blocking in the lens barrel. Only if the mirror 32 is located between the SLM 12 and the aperture plate 132 among the plurality of lenses in the projection optical system 13, the mirror 32 may be located at another position other than those shown in FIGS. 4, 9, 13.

A part (or member(s)) for performing light blocking in the lens barrel is not limited to the mirror 32 or the aperture plate 132. For example, an opening plate having a cooling mechanism which is similar to the aperture plate 132 may be provided instead of the mirror 32, or may be provided at another position. Only if heat generation caused by vignetting of the first order diffracted light in the lens barrel can be prevented, i.e., light blocking can be performed before the light is vignetted by the lenses in the lens barrel, a part (or member(s)) for performing light blocking may be located at various positions in various manners.

A part (or member(s)) for removing heat generated by light blocking is not limited to the light-block water-cooling jacket 43, the cooling mechanism 152, or the like, for example, a heat transfer member such as heat pipes or the like is attached to a member(s) provided instead of the aperture plate 132 or the light-block water-cooling jacket 43, and heat from the heat transfer member may be removed by a water-cooling jacket. Cooling is not limited to water-cooled type, for example, fins may be provide with the aperture plate 132, or a blocking member having fins may be provided instead of the light-block water-cooling jacket 43, and cooling in air-cooled type may be performed by applying air from a fan.

It is not necessary that all the first order diffracted light enter the projection optical system 13, a part of the first order diffracted light may be blocked outside the projection optical system 13, and heat generated by outside light blocking may be removed as appropriate.

In the above preferred embodiment, (AP1/AP2), which is the condition for easily producing a design for guiding the first order diffracted light to the aperture plate 132, falls in the range about 1.1 to 1.2, but may be more than 1.2. However, from the view point of easy design or decrease in aberration, it is preferable (AP1/AP2) is 1.7 or less. (AP1/AP2) may be a positive number less than 1.

In the above preferred embodiment, (L1(a length between the object and the image)/L2(the object length)) is made 4.0 so that irradiation of illumination light to the SLM 12 is not blocked by the lens 511, but in a case where L1 is 400, it is possible to shorten L2 to about 80. It is therefore preferable that (L1/L2) is at least less than 5.0.

Though in the above preferred embodiment, the aperture plate 132 is located between the third lens group 53 and the fourth lens group 54, the aperture plate 132 may be located between the lens closest to the recording medium 9 and the recording medium 9 in the lens barrel, i.e., closer to the recording medium 9 than any other lenses.

While the invention has been shown and described in detail, the foregoing description is in all aspects illustrative and not restrictive. It is therefore understood that numerous modifications and variations can be devised without departing from the scope of the invention.

This application claims priority benefit under 35 U.S.C. Section 119 of Japanese Patent Application No. 2005-122577 and Japanese Patent Application No. 2006-3197 filed in the Japan Patent Office on Apr. 20, 2005 and Jan. 11, 2006, the entire disclosure of which is incorporated herein by reference.

What is claimed is:

1. An image recording apparatus for recording an image on a recording medium by irradiation of light, comprising:

a light source;

a spatial light modulator having a plurality of light modulator elements of diffraction grating type for reflecting light from said light source;

a projection optical system for guiding zeroth order light from said plurality of light modulator elements to a recording medium and projecting an image of said spatial light modulator onto said recording medium; and a scanning mechanism for scanning said recording medium with an irradiation of said zeroth order light, wherein said projection optical system comprises a lens barrel which said zeroth order light and all of first order diffracted light from said plurality of light modulator elements enter;

a light blocking part for blocking said first order diffracted light in said lens barrel;

a plurality of lenses arranged in said lens barrel for guiding said zeroth order light to said recording medium and guiding said first order diffracted light to said light blocking part; and a heat removing part for removing heat generated by light blocking performed by said light blocking part;

said light blocking part is an aperture plate located at a position among said plurality of lenses; and a lens group, which is adjacent to said aperture plate and between said aperture plate and said spatial light modulator, has negative power.

2. The image recording apparatus according to claim 1, wherein said heat removing part is a cooling mechanism connected to said aperture plate.

3. An image recording apparatus for recording an image on a recording medium by irradiation of light, comprising:

a light source;

a spatial light modulator having a plurality of light modulator elements of diffraction grating type for reflecting light from said light source;

a projection optical system for guiding zeroth order light from said plurality of light modulator elements to a recording medium and projecting an image of said spatial light modulator onto said recording medium; and a scanning mechanism for scanning said recording medium with an irradiation of said zeroth order light, wherein said projection optical system comprises a lens barrel;

a plurality of lenses arranged in said lens barrel;

a light blocking part for blocking first order diffracted light from said plurality of light modulator elements in said lens barrel; and a heat removing part for removing heat generated by light blocking performed by said light blocking part, said light blocking part comprises an aperture plate located either among said plurality of lenses or between said plurality of lenses and said recording medium and located in said lens barrel; and a mirror for reflecting a part of first order diffracted light from said spatial light modulator, said mirror being located between said spatial light modulator and said aperture plate and being located among said plurality of lenses.

4. The image recording apparatus according to claim 3, wherein said aperture plate is located among said plurality of lenses.

5. The image recording apparatus according to claim 3, wherein at least one lens is located between said aperture plate and said mirror.

6. The image recording apparatus according to claim 3, wherein at least one lens between said spatial light modulator and said mirror has positive power and enough size to receive all first order diffracted light from said spatial light modulator, and a part of said first order diffracted light from said spatial light modulator is guided to said mirror through said at least one lens, and said part of said first order diffracted light reflected by said mirror is guided outside said lens barrel through said at least one lens.

7. The image recording apparatus according to claim 6, wherein a lens closest to said spatial light modulator has a size covering a range of parallel projection of said spatial light modulator onto position of said lens along an optical axis.

8. The image recording apparatus according to claim 6, wherein said at least one lens between said spatial light modulator and said mirror includes a doublet structure.

9. The image recording apparatus according to claim 3, wherein said heat removing part comprises a first cooling mechanism connected to said aperture plate; and a second cooling mechanism for receiving light reflected by said mirror outside said lens barrel to remove heat generated by receiving said light.

10. An image recording apparatus for recording an image on a recording medium by irradiation of light, comprising:

a light source;

a spatial light modulator having a plurality of light modulator elements of diffraction grating type for reflecting light from said light source;

a projection optical system for guiding zeroth order light from said plurality of light modulator elements to a recording medium and projecting an image of said spatial light modulator onto said recording medium; and a scanning mechanism for scanning said recording medium with an irradiation of said zeroth order light, wherein said projection optical system comprises a lens barrel which said zeroth order light and all of first order diffracted light from said plurality of light modulator elements enter;

a light blocking part for blocking said first order diffracted light in said lens barrel;

a plurality of lenses arranged in said lens barrel for guiding said zeroth order light to said recording medium and guiding said first order diffracted light to said light blocking part; and a heat removing part for removing heat generated by light blocking performed by said light blocking part;

said light blocking part is an aperture plate located at a position among said plurality of lenses; and (AP1/AP2) is smaller than 1.7, where AP1 is the maximum aperture of lenses which are included in a lens group closest to said spatial light modulator among said plurality of lenses, and AP2 is the maximum aperture of lenses between said lens group and said aperture plate.

11. The image recording apparatus according to claim 3, wherein (AP1/AP2) is smaller than 1.7 where AP1 is the maximum aperture of lenses which are included in a lens group closest to said spatial light modulator among said plurality of lenses, and AP2 is the maximum aperture of lenses between said lens group and said aperture plate.

12. An image recording apparatus for recording an image on a recording medium by irradiation of light, comprising:

a light source;

a spatial light modulator having a plurality of light modulator elements of diffraction grating type for reflecting light from said light source;

a projection optical system for guiding zeroth order light from said plurality of light modulator elements to a recording medium and projecting an image of said spatial light modulator onto said recording medium; and a scanning mechanism for scanning said recording medium with an irradiation of said zeroth order light, wherein said projection optical system comprises a lens barrel;

a plurality of lenses arranged in said lens barrel;

a light blocking part for blocking first order diffracted light from said plurality of light modulator elements in said lens barrel; and a heat removing part for removing heat generated by light blocking performed by said light blocking part, wherein (L1/L2) is smaller than 5.0, where L1 is a distance between said spatial light modulator and said recording medium, and L2 is a distance between said spatial light modulator and a lens closest to said spatial light modulator among said plurality of lenses.

13. The image recording apparatus according to claim 1, wherein said light source comprises a semiconductor laser.

14. The image recording apparatus according to claim 1, wherein a projection ratio of said projection optical system is variable.

15. The image recording apparatus according to claim 3, wherein said light source comprises a semiconductor laser.

16. The image recording apparatus according to claim 3, wherein a projection ratio of said projection optical system is variable.

17. The image recording apparatus according to claim 12, wherein said light source comprises a semiconductor laser.

18. The image recording apparatus according to claim 12, wherein a projection ratio of said projection optical system is variable.

* * * * *